(12) United States Patent
Watanabe

(10) Patent No.: US 8,655,567 B2
(45) Date of Patent: Feb. 18, 2014

(54) BRAKE CONTROL DEVICE

(75) Inventor: Yoshinori Watanabe, Gotenba-shi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 85 days.

(21) Appl. No.: 13/505,404

(22) PCT Filed: Nov. 9, 2009

(86) PCT No.: PCT/JP2009/005963
§ 371 (c)(1),
(2), (4) Date: May 1, 2012

(87) PCT Pub. No.: WO2011/055419
PCT Pub. Date: May 12, 2011

(65) Prior Publication Data
US 2012/0215414 A1 Aug. 23, 2012

(51) Int. Cl.
*G06F 7/70* (2006.01)
(52) U.S. Cl.
USPC ............................................. 701/70; 303/155
(58) Field of Classification Search
USPC ........... 701/70, 78, 83, 36; 303/155, 177, 191
See application file for complete search history.

(56) References Cited

U.S. PATENT DOCUMENTS

| 4,755,008 | A | * | 7/1988 | Imoto et al. | 303/113.2 |
| 5,472,266 | A | | 12/1995 | Volz et al. | |
| 5,509,730 | A | * | 4/1996 | Ando et al. | 303/117.1 |
| 5,628,550 | A | | 5/1997 | Zaviska et al. | |
| 5,740,042 | A | * | 4/1998 | Fujioka | 701/71 |
| 5,971,503 | A | * | 10/1999 | Joyce et al. | 303/191 |
| 5,984,261 | A | * | 11/1999 | Akita | 251/127 |
| 6,336,689 | B1 | * | 1/2002 | Eguchi et al. | 303/187 |
| 6,464,307 | B1 | * | 10/2002 | Yoshino | 303/11 |
| 8,029,072 | B2 | * | 10/2011 | Miyazaki et al. | 303/113.4 |
| 2007/0216222 | A1 | * | 9/2007 | Miyazaki et al. | 303/155 |
| 2010/0295363 | A1 | * | 11/2010 | Miyazaki | 303/11 |

FOREIGN PATENT DOCUMENTS

| JP | A-7-503204 | 4/1995 |
| JP | A-7-503205 | 4/1995 |
| JP | A-8-175355 | 7/1996 |
| JP | A-2001-47994 | 2/2001 |
| JP | A-2002-2462 | 1/2002 |
| JP | A-2002-217028 | 8/2002 |

OTHER PUBLICATIONS

International Search Report issued in International Application No. PCT/JP2009/005963 on Feb. 9, 2010 (with translation).

* cited by examiner

*Primary Examiner* — Thomas Black
*Assistant Examiner* — Shardul Patel
(74) *Attorney, Agent, or Firm* — Oliff PLC

(57) ABSTRACT

Included are pressure increasing valves and pressure reducing valves as flow control valves, placed between a brake fluid pressure generation unit on an upstream side that generates brake fluid pressure and a braking force generation unit on a downstream side that generates braking force in accordance with the brake fluid pressure to a wheel, that regulates the brake fluid pressure to the braking force generation unit by controlling the flow rate of brake fluid, and an electronic control unit is provided with: a differential pressure obtaining unit that obtains information on the difference of brake fluid pressure from the brake fluid pressure on upstream and downstream sides of the flow control valve; a hydrodynamic force obtaining unit that obtains information on hydrodynamic force induced in a valve element by the flow of brake fluid passing through the flow control valve; and a brake fluid pressure control unit that controls the flow control valve by use of the information on the differential pressure and the information on the hydrodynamic force.

10 Claims, 7 Drawing Sheets

BRAKE CONTROL DEVICE

FIELD

The present invention relates to a brake control device that controls braking force of each wheel in a vehicle.

BACKGROUND

A wide variety of configurations are conventionally known for this type of brake control device. For example, Patent Literature 1 below discloses a brake control device that regulates the braking force of a wheel by increasing or reducing brake fluid pressure accompanied by the open and close control of a solenoid valve. In the brake control device of Patent Literature 1, when ABS control takes place, the master cylinder pressure and the wheel cylinder pressure, which are brake fluid pressure on the upstream and downstream sides of a solenoid valve, are estimated to estimate the amount of increase or reduction in the wheel cylinder pressure at each cycle based on the difference between the master cylinder pressure and the wheel cylinder pressure; accordingly, a duty ratio of a solenoid valve drive pulse, in other words, the current value of rectangular wave current applied to the solenoid valve, to realize the amount of increase or reduction in pressure, is computed.

CITATION LIST

Patent Literature

Patent Literature 1: Japanese Patent Application Laid-open No. 8-175355

SUMMARY

Technical Problem

As described above, in order to realize a desired amount of increase or reduction in pressure, it is necessary to apply current having an appropriate current value to enable the realization to the solenoid valve. For example, if a brake device for a vehicle is provided with detection means such as sensors for detecting the master cylinder pressure and the wheel cylinder pressure respectively, it is possible to obtain an appropriate current value to enable the realization of a desired amount of increase or reduction in pressure by feedback control based on differential pressure obtained by the detected values. In contrast, if even one of the detection means such as sensors is not provided, since the current value of applied current to the solenoid valve is determined based on the estimated difference between the master cylinder pressure and the wheel cylinder pressure, the current value is not appropriate, and therefore it may not be possible to realize a desired amount of increase or reduction in pressure.

Hence, an object of the present invention is to provide a brake control device that improves the disadvantage held by such a conventional example and can increase or reduce the wheel cylinder pressure with good accuracy even without means for detecting brake fluid pressure.

Solution to Problem

In order to achieve the above mentioned object, a brake control device according to the present invention includes a flow control valve, placed between a brake fluid pressure generation unit on an upstream side that generates brake fluid pressure and a braking force generation unit on a downstream side that generates braking force in accordance with the brake fluid pressure to a wheel, that regulates the brake fluid pressure to the braking force generation unit by controlling a flow rate of brake fluid; a differential pressure obtaining means that obtains, from brake fluid pressure on upstream and downstream sides of the flow control valve, information on a difference of the brake fluid pressure; a hydrodynamic force obtaining means that obtains information on hydrodynamic force induced in a valve element by a flow of brake fluid passing through the flow control valve; and a brake fluid pressure control means that controls the flow control valve by use of the information on the differential pressure and the information on the hydrodynamic force.

Here, it is desirable that applied current for operating the valve element is set by use of the information on the differential pressure and the information on the hydrodynamic force, and the brake fluid pressure control means applies the applied current to the flow control valve configured as an on-off valve that controls a flow rate of brake fluid by opening and closing a flow passage of the brake fluid with the valve element, thereby driving the flow control valve to be opened and closed.

Further, it is desirable that applied rectangular wave current for operating the valve element is obtained by use of the information on the differential pressure and the information on the hydrodynamic force and a current value of the applied current at the time when the valve is open is corrected in accordance with a pulse width of the rectangular wave at the time when the valve is open, and the brake fluid pressure control means applies the corrected applied current to the flow control valve configured as an on-off valve that controls a flow rate of brake fluid by opening and closing a flow passage of the brake fluid with the valve element, thereby driving the flow control valve to be opened and closed.

It is desirable that the current value of the applied current at the time when the valve is open is corrected to decrease a valve opening degree of the flow control valve as the pulse width at the time when the valve is open becomes longer while being corrected to increase the valve opening degree of the flow control valve as the pulse width at the time when the valve is open becomes shorter.

Further, in the present invention, it is desirable to further include a brake flow rate obtaining means that computes a necessary brake fluid passage flow rate, in the flow control valve, necessary to increase the brake fluid pressure to the braking force generation unit with a desired target pressure increase gradient, and computes a brake fluid passage flow rate in each opening degree stage of the flow control valve; a opening degree stage setting means that sets the opening degree stage of the flow control valve to an opening degree stage corresponding to a minimum satisfying the necessary brake fluid passage flow rate or a maximum not exceeding the necessary brake fluid passage flow rate, among the brake fluid passage flow rates; and an applied current setting means that determines a pulse width of applied rectangular wave current at the time when the valve is open for operating the valve element based on the differential pressure, a valve opening degree in the set opening degree stage and the necessary brake fluid passage flow rate, and obtains a current value of the applied current at the time when the valve is open by use of the information on the differential pressure and the information on the hydrodynamic force as well as corrects the current value at the time when the valve is open in accordance with the pulse width of the rectangular wave at the time when the valve is open, wherein it is desirable that the brake fluid pressure control means applies the corrected applied current to the flow control valve configured as an on-off valve that controls a flow rate of brake fluid by opening and closing a flow passage of the brake fluid with the valve element, thereby driving the flow control valve to be opened and closed.

Still further, in the present invention, it is desirable to further include a settable valve open pulse width computing means that obtains a pulse width of applied rectangular wave current settable within a range not exceeding a predetermined pressure increase control time at the time when the valve is open; a brake flow rate obtaining means that computes a total brake fluid passage volume of the flow control valve necessary to increase the brake fluid pressure to the braking force generation unit with a desired target pressure increase gradient as well as computes a brake fluid passage volume settable by all combinations of opening degree stages of the flow control valve and the settable pulse widths at the time when the valve is open, and selects a maximum not exceeding the total brake fluid passage volume or a minimum exceeding the total brake fluid passage volume from the settable brake fluid passage volumes; an opening degree stage setting means that sets the opening degree stage of the flow control valve to an opening degree stage corresponding to the selected brake fluid passage volume; and an applied current setting means that sets the pulse width of the applied current at the time when the valve is open to a pulse width corresponding to the selected brake fluid passage volume, and obtains a current value of the applied current at the time when the valve is open by use of the information on the differential pressure and the information on the hydrodynamic force as well as corrects the current value at the time when the valve is open in accordance with the set pulse width at the time when the valve is open, wherein it is desirable that the brake fluid pressure control means applies the corrected applied current to the flow control valve configured as an on-off valve that controls a flow rate of brake fluid by opening and closing a flow passage of the brake fluid with the valve element, thereby driving the flow control valve to be opened and closed.

The hydrodynamic force is a sum of forces in valve closing and opening directions working on the valve element by the flow of the brake fluid passing through the flow control valve. And, the force in the valve closing direction is Bernoulli force proportional to a square of the differential pressure, and the force in the valve opening direction is cavitation force proportional to the differential pressure and inversely proportional to the brake fluid pressure on the downstream side of the flow control valve.

Further, it is desirable that the flow control valve includes an elastic body causing elastic force in a direction opposite to acting force on the valve element by applied current, to act on the valve element, and the brake fluid pressure control means controls the flow control valve by use of information on the elastic force in addition to the information on the differential pressure and the information on the hydrodynamic force.

Further, it is desirable that the flow control valve includes an elastic body causing elastic force in a direction opposite to acting force on the valve element by the applied current, to act on the valve element, and the applied current setting means sets the applied current by use of information on the elastic force in addition to the information on the differential pressure and the information on the hydrodynamic force.

Advantageous Effects of Invention

A brake control device according to the present invention controls a flow control valve by use of not only information on the difference between upstream and downstream brake fluid pressure in the flow control valve but also information on hydrodynamic force (Bernoulli force in the valve closing direction and cavitation force in the valve opening direction) induced in a valve element by the flow of the brake fluid passing through the flow control valve. Upon the control, applied current to the flow control valve being an on-off valve is determined by use of the information on the differential pressure and the hydrodynamic force. Moreover, if the pulse width of applied rectangular wave current at the time when the valve is open is changed, the applied current is corrected in accordance with the pulse width. Hence, the brake control device can appropriately control the flow of the brake fluid through the flow control valve, and it is made possible to increase and reduce the wheel cylinder pressure with high precision.

Furthermore, the opening degree stage of the flow control valve is set to one corresponding to a minimum that satisfies a necessary brake fluid passage flow rate required to increase pressure with a target pressure increase gradient, or a maximum that does not exceed the necessary brake fluid passage flow rate among the brake fluid passage flow rates in the opening degree stages, and the pulse width of applied current at the time when the valve is open is determined based on the opening degree stage, the differential pressure and the necessary brake fluid passage flow rate. The current value of applied current to the flow control valve at the time when the valve is open is obtained by use of information on the differential pressure and the hydrodynamic force, and is corrected in accordance with the pulse width at the time when the valve is open. Hence, according to the brake control device, the wheel cylinder pressure is increased at the minimum necessary valve opening degree; accordingly, it is possible to reduce the operation sound and vibration when the flow control valve is opened or closed.

Furthermore, with regard to the pulse width of applied current at the time when the valve is open, those that can be set within a range that does not exceed a predetermined pressure increase control time are obtained, and with regard to the opening degree stage of the flow control valve, a maximum that does not exceed a total brake fluid passage volume or a minimum that exceeds the total brake fluid passage volume, which is required to increase pressure with a target pressure increase gradient, is selected from brake fluid passage volumes that can be set by all combinations of the opening degree stages and the settable pulse widths at the time when the valve is open, and one corresponding to the selected brake fluid passage volume is set. The current value of applied current to the flow control valve at the time when the valve is open is obtained by use of the information on the differential pressure and the hydrodynamic force, and is corrected in accordance with the pulse width at the time when the valve is open. Hence, according to the brake control device, it is possible to pass the brake fluid with a volume closest to the total brake fluid passage volume within a predetermined pressure increase control time; accordingly, it is made possible to quickly increase the wheel cylinder pressure.

DESCRIPTION OF EMBODIMENTS

A detailed description will hereinafter be given on embodiments of a brake control device according to the present invention based on the drawings. The present invention is not limited to the following embodiments.

First Embodiment

A description will be given on a first embodiment of a brake control device according to the present invention based on FIGS. 1 to 7.

The brake control device includes a brake device for a vehicle that can increase or reduce brake fluid pressure to each of wheels Wfl, Wfr, Wrl and Wrr (that is, wheel cylinder pressure Pwc) by applying current to a solenoid valve, and a braking force control device that controls braking force over the brake device for a vehicle as a control target. Control functions of the braking force control device are configured by an electronic control unit (ECU) 1 shown in FIG. 1.

Firstly, a description will be given on an example of the brake device for a vehicle of the first embodiment based on FIG. 1.

The brake device for a vehicle illustrated here can regulate the braking force of each of the wheels Wfl, Wfr, Wrl and Wrr individually, and is also configured such that the braking force can be applied only to at least one of the wheels Wfl, Wfr, Wrl and Wrr.

To roughly classify, the brake device for a vehicle includes a brake fluid pressure generation unit 5 that generates brake fluid pressure, a brake fluid pressure regulation unit 6 as an actuator that can regulate the brake fluid pressure for each of the wheels Wfl, Wfr, Wrl and Wrr, and a braking force generation unit 7 that generates braking force to be applied to each of the wheels Wfl, Wfr, Wrl and Wrr by use of the brake fluid pressure.

Figure 1:
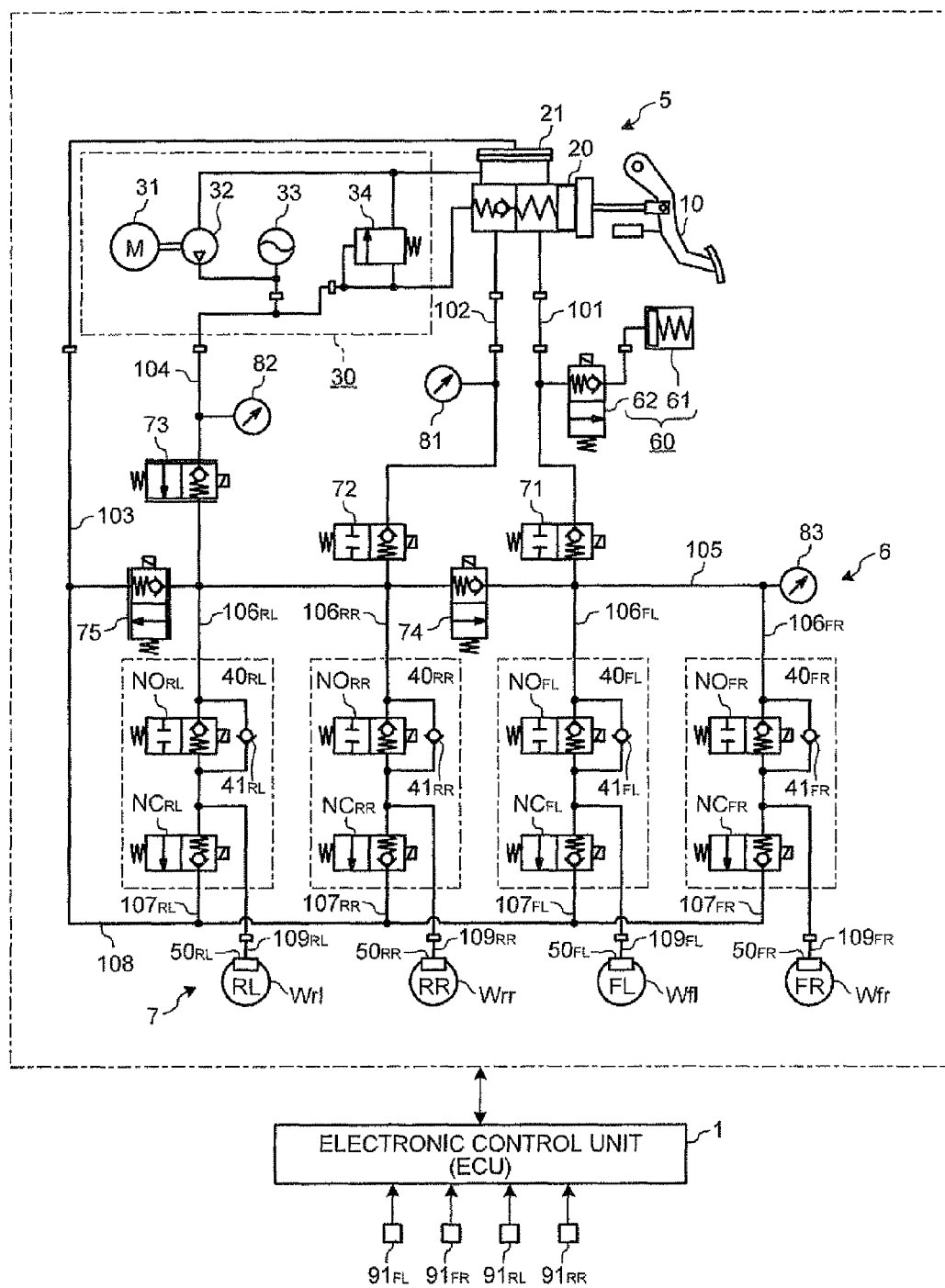
FIG. 1 is a view illustrating a configuration of a brake control device according to the present invention.

Specifically, as shown in FIG. 1, provided as the brake fluid pressure generation unit 5 in the brake device for a vehicle are brake fluid pressure generation means 20 that generates brake fluid pressure (master cylinder pressure Pmc) in accordance with the operation amount of a brake pedal 10 by a driver, and high-pressure generation means 30 that applies pressure to the brake fluid to generate higher brake fluid pressure (accumulator pressure Pacc) than the brake fluid pressure generated by the brake fluid pressure generation means 20. Moreover, the brake device for a vehicle is provided with brake fluid pressure regulation means $40_{FL}$, $40_{FR}$, $40_{RL}$ and $40_{RR}$, which form a part of the brake fluid pressure regulation unit 6, for the wheels Wfl, Wfr, Wrl and Wrr, respectively. These brake fluid pressure regulation means $40_{FL}$, $40_{FR}$, $40_{RL}$ and $40_{RR}$ can regulate the brake fluid pressure generated by the brake fluid pressure generation means 20 and the high-pressure generation means 30. Moreover, the brake device for a vehicle is supplied with the brake fluid pressure (wheel cylinder pressure Pwc) through each of the brake fluid pressure regulation means $40_{FL}$, $40_{FR}$, $40_{RL}$ and $40_{RR}$, and braking force generation means $50_{FL}$, $50_{FR}$, $50_{RL}$ and $50_{RR}$ for the wheels Wfl, Wfr, Wrl and Wrr, respectively, that generate braking force in accordance with the brake fluid pressure is provided as the braking force generation unit 7.

Firstly, the brake fluid pressure generation means 20 is provided with a master cylinder that generates the brake fluid pressure (the master cylinder pressure Pmc) in accordance with the operation amount of the brake pedal 10 by the driver and a hydraulic booster that generates brake fluid pressure (regulator pressure Pre) in accordance with the operation amount. In the first embodiment, illustrated is the brake fluid pressure generation means 20 in which the master cylinder and the hydraulic booster are combined in one unit.

The master cylinder includes a pressure chamber in which pressure is applied in accordance with the motion of the brake pedal 10, and is connected to a master passage 101 via the pressure chamber. Moreover, the hydraulic booster is connected to a booster passage 102 via a booster chamber, and is further connected to the downstream side (a high-pressure passage 104) of an accumulator 33, which will be described later, in the high-pressure generation means 30.

Here, a stroke simulator device 60 including a stroke simulator 61 and a simulator control valve 62 is connected on the master passage 101. The simulator control valve 62 is a normally closed solenoid valve that is normally closed in principle, and operates in accordance with a control instruction of brake fluid pressure control means of the electronic control unit 1. The simulator control valve 62 is closed by not supplying current to the solenoid or applying current having a current value Iclose to the solenoid while being opened by applying current having a current value Iopen (>Iclose) to the solenoid, and sends the brake fluid from the master passage 101 to the stroke simulator 61.

Furthermore, a master cylinder pressure supply control valve 71 (what is called a master cut valve) that controls a communicating or shut-off state between the pressure chamber of the master cylinder and a main control pressure passage 105, which will be described later, to control the state of supplying the master cylinder pressure Pmc to the brake fluid pressure regulation means $40_{FL}$ and $40_{FR}$ of the left front wheel Wfl and the right front wheel Wfr, respectively, is placed on the downstream side (on the wheels Wfl, Wfr, Wrl and Wrr side) to a connection portion with the stroke simulator device 60 on the master passage 101. The master cylinder pressure supply control valve 71 is a normally opened solenoid valve that is normally opened in principle, and operates in accordance with a control instruction of the brake fluid pressure control means of the electronic control unit 1. The master cylinder pressure supply control valve 71 is opened by not supplying current to the solenoid or applying current having the current value Iopen to the solenoid while being closed by applying current having the current value Iclose (>Iopen) to the solenoid.

Moreover, a regulator pressure sensor 81 that detects the regulator pressure Pre is connected on the booster passage 102. A detection signal of the regulator pressure sensor 81 is transmitted to the electronic control unit 1.

Furthermore, a regulator pressure supply control valve 72 (what is called a regulator cut valve) that controls a communicating or shut-off state between the booster chamber of the hydraulic booster and the main control pressure passage 105 to control the state of supplying the regulator pressure Pre to the brake fluid pressure regulation means $40_{RL}$ and $40_{RR}$ of the left rear wheel Wrl and the right rear wheel Wrr, respectively, is placed on the downstream side (the wheels Wfl, Wfr, Wrl and Wrr side) to a connection portion with the regulator pressure sensor 81 on the booster passage 102. The regulator pressure supply control valve 72 is a normally opened solenoid valve that is normally opened in principle, and operates in accordance with a control instruction of the brake fluid pressure control means of the electronic control unit 1. The regulator pressure supply control valve 72 is opened by not supplying current to the solenoid or applying current having the current value Iopen to the solenoid while being closed by applying current having the current value Iclose (>Iopen) to the solenoid.

A reservoir 21 is connected to the brake fluid pressure generation means 20. The reservoir 21 stores the brake fluid under atmospheric pressure, and is connected to a reservoir passage 103.

Next, as shown in FIG. 1, the high-pressure generation means 30 includes a motor 31, a pump 32 that is driven by the motor 31 to pump up the brake fluid in the reservoir 21, and applies pressure to the brake fluid to discharge it, the accumulator 33 that stores the brake fluid to which pressure is applied by the pump 32, and a relief valve 34 that, when the brake fluid pressure reaches the set pressure or more, returns the excess to the low pressure side. The motor 31 is driven and controlled by high-pressure control means of the electronic control unit 1 so as to regulate the pressure in the accumulator 33 (the accumulator pressure Pacc) within a predetermined range.

The high-pressure passage 104 is connected to the downstream side (in other words, the high-pressure side) of the pump 32 and the accumulator 33 in the high-pressure generation means 30.

Here, an accumulator pressure sensor 82 that detects the accumulator pressure Pacc is connected on the high-pressure passage 104. A detection signal of the accumulator pressure sensor 82 is transmitted to the electronic control unit 1.

Moreover, an accumulator pressure supply control valve 73 (what is called a linear pressure increase control valve) that controls a communicating or shut-off state between the high-pressure generation means 30 and the main control pressure passage 105 to control the state of supplying the high brake fluid pressure (the accumulator pressure Pacc) from the high-pressure generation means 30 to the main control pressure passage 105 is placed on the downstream side (the wheels Wfl, Wfr, Wrl and Wrr side) to a connection portion with the accumulator pressure sensor 82 on the high-pressure passage 104. The accumulator pressure supply control valve 73 is a normally closed liner solenoid control valve that is normally closed in principle, and operates in accordance with a control instruction of the brake fluid pressure control means of the electronic control unit 1. The accumulator pressure supply control valve 73 is opened in accordance with current supplied to the solenoid to feed the accumulator pressure Pacc to the downstream side (the main control pressure passage 105 side).

In the first embodiment, the above-mentioned master passage 101, booster passage 102, high-pressure passage 104, and reservoir passage 103 are connected to the main control pressure passage 105 shown in FIG. 1 in this order. Upstream side control pressure passages $106_{FL}$, $106_{FR}$, $106_{RL}$ and $106_{RR}$ of the brake fluid pressure regulation means $40_{FL}$, $40_{FR}$, $40_{RL}$ and $40_{RR}$ are connected to the main control pressure passage 105, respectively. Upstream here indicates the brake fluid pressure generation means 20 side and the high-pressure generation means 30 side when viewed with each of the brake fluid pressure regulation means $40_{FL}$, $40_{FR}$, $40_{RL}$ and $40_{RR}$ being the center. Hence, downstream in that case indicates the braking force generation means $50_{FL}$, $50_{FR}$, $50_{RL}$ and $50_{RR}$ sides.

Here, placed on the main control pressure passage 105 are a dividing control valve 74 between connection portions, respectively, with the master passage 101 and the booster passage 102 as shown in FIG. 1, and a linear pressure reducing control valve 75 shown in FIG. 1 between connection portions, respectively, with the reservoir passage 103 and the high-pressure passage 104. Furthermore, the main control pressure passage 105 is connected to the brake fluid pressure regulation means $40_{FL}$ and $40_{FR}$ of the left and right front wheels Wfl and Wfr, respectively, on one side of the passage across the dividing control valve 74 and is connected to the brake fluid pressure regulation means $40_{RL}$ and $40_{RR}$ of the left and right rear wheels Wrl and Wrr, respectively, on the other side of the passage. The brake fluid pressure regulation means $40_{FL}$ and $40_{FR}$ are connected to the one side of the passage via the upstream side control pressure passages $106_{FL}$ and $106_{FR}$, respectively. Moreover, the brake fluid pressure regulation means $40_{RL}$ and $40_{RR}$ are connected between the dividing control valve 74 and the linear pressure reducing control valve 75 on the other side of the passage via the upstream side control pressure passages $106_{RL}$ and $106_{RR}$, respectively. A brake fluid pressure sensor 83 that detects the brake fluid pressure (mainly, the master cylinder pressure Pmc) in the passage is connected on the one side of the passage. A detection signal of the brake fluid pressure sensor 83 is transmitted to the electronic control unit 1.

The dividing control valve 74 is for creating a state where the main control pressure passage 105 is divided into two parts, and a state where communication is provided between the divided passages as necessary. The dividing control valve 74 is a normally closed solenoid valve that is normally closed in principle, and operates in accordance with a control instruction of the brake fluid pressure control means of the electronic control unit 1. The dividing control valve 74 is closed by not supplying current to the solenoid or applying current having the current value Iclose to the solenoid while being opened by applying current having the current value Iopen (>Iclose) to the solenoid to feed the brake fluid from the above other side of the passage to one side of the passage of the main control pressure passage 105.

Moreover, the linear pressure reducing control valve 75 is provided to reduce the brake fluid pressure of the upstream side control pressure passages $106_{FL}$, $106_{FR}$, $106_{RL}$ and $106_{RR}$ of the brake fluid pressure regulation means $40_{FL}$, $40_{FR}$, $40_{RL}$ and $40_{RR}$ when the supply of accumulator pressure Pacc is stopped. The linear pressure reducing control valve 75 is a normally closed liner solenoid control valve that is normally closed in principle, and operates in accordance with a control instruction of the brake fluid pressure control means of the electronic control unit 1. The linear pressure reducing control valve 75 is closed by not supplying current to the solenoid or applying current having the current value Iclose to the solenoid while being opened by applying current having the current value Iopen (>Iclose) to the solenoid to feed the brake fluid from the above other side of the passage of the main control pressure passage 105 to the reservoir passage 103.

Next, a detailed description will be given on the brake fluid pressure regulation means $40_{FL}$, $40_{FR}$, $40_{RL}$ and $40_{RR}$.

As described above, these brake fluid pressure regulation means $40_{FL}$, $40_{FR}$, $40_{RL}$ and $40_{RR}$ are for regulating the brake fluid pressure generated by the brake fluid pressure generation means 20 and the high-pressure generation means 30, and are for regulating each brake fluid pressure supplied to the braking force generation means $50_{FL}$, $50_{FR}$, $50_{RL}$ and $50_{RR}$ of the wheels Wfl, Wfr, Wrl and Wrr to execute what is called ABS control, what is called traction control, and the like. The braking force generation means $50_{FL}$, $50_{FR}$, $50_{RL}$ and $50_{RR}$ are ones including a disc rotor and a caliper, for example. Therefore, the brake fluid pressure in this case is supplied to the caliper.

The downstream sides of the brake fluid pressure regulation means $40_{FL}$, $40_{FR}$, $40_{RL}$ and $40_{RR}$ are connected to a main pressure reducing passage 108 via pressure reducing passages $107_{FL}$, $107_{FR}$, $107_{RL}$ and $107_{RR}$ shown in FIG. 1, respectively. The main pressure reducing passage 108 is connected to the reservoir 21 via the reservoir passage 103.

The brake fluid pressure regulation means $40_{FL}$ of the left front wheel Wfl is a flow control valve that regulates the brake fluid pressure to the braking force generation means $50_{FL}$ by controlling the flow rate of the brake fluid, and has an on-off valve that controls the flow rate of the brake fluid by opening and closing the flow passage of the brake fluid. Specifically, as the flow control valve (on-off valve), the brake fluid pressure regulation means $40_{FL}$ includes a pressure increasing valve $NO_{FL}$ being a normally opened solenoid valve that is normally opened in principle and operating in accordance with a control instruction of the brake fluid pressure control means of the electronic control unit 1, and a pressure reducing valve $NC_{FL}$ being a normally closed solenoid valve that is normally closed in principle and operating in accordance with a control instruction of the brake fluid pressure control means.

The pressure increasing valve $NO_{FL}$ is opened, as shown in FIG. 1, by not supplying current to the solenoid or applying current having the current value Iopen to the solenoid, and causes the upstream part (the main control pressure passage 105) of the brake fluid pressure regulation means $40_{FL}$ to communicate with the braking force generation means $50_{FL}$ of the left front wheel Wfl. On the other hand, the pressure increasing valve $NO_{FL}$ is closed by applying current having the current value Iclose (>Iopen) to the solenoid, and shuts off communication between the upstream part of the brake fluid pressure regulation means $40_{FL}$ and the braking force generation means $50_{FL}$. The pressure increasing valve $NO_{FL}$ includes a check valve $41_{FL}$ so as not to contain the pressure on the downstream side.

Moreover, the pressure reducing valve $NC_{FL}$ is closed by not supplying current to the solenoid or applying current having the current value Iclose to the solenoid, and shuts off communication between the braking force generation means $50_{FL}$ of the left front wheel Wfl and the reservoir 21. On the other hand, the pressure reducing valve $NC_{FL}$ is opened by applying current having the current value Iopen (>Iclose) to the solenoid, and causes the braking force generation means $50_{FL}$ to communicate with the reservoir 21.

In the brake fluid pressure regulation means $40_{FL}$, a left front wheel passage $109_{FL}$ shown in FIG. 1 is connected between the pressure increasing valve $NO_{FL}$ and the pressure reducing valve $NC_{FL}$. The left front wheel passage $109_{FL}$ is also connected to the braking force generation means $50_{FL}$ of the left front wheel Wfl.

The brake fluid pressure regulation means $40_{FL}$ supplies the brake fluid in the upstream part of the brake fluid pressure regulation means $40_{FL}$ to the braking force generation means $50_{FL}$ when the pressure increasing valve $NO_{FL}$ is open and the pressure reducing valve $NC_{FL}$ is closed. Accordingly, the brake fluid pressure regulation means $40_{FL}$ increases the brake fluid pressure of the braking force generation means $50_{FL}$ of the left front wheel Wfl (a pressure increase mode). Moreover, the brake fluid pressure regulation means $40_{FL}$ holds the brake fluid pressure of the braking force generation means $50_{FL}$ with the magnitude unchanged when the pressure increasing valve $NO_{FL}$ and the pressure reducing valve $NC_{FL}$ are both closed (a holding mode). Moreover, the brake fluid pressure regulation means $40_{FL}$ returns the brake fluid in the braking force generation means $50_{FL}$ to the reservoir 21 when the pressure increasing valve $NO_{FL}$ is closed and the pressure reducing valve $NC_{FL}$ is open. Accordingly, the brake fluid pressure regulation means $40_{FL}$ reduces the brake fluid pressure of the braking force generation means $50_{FL}$ of the left front wheel Wfl (a pressure reduction mode).

As shown in FIG. 1, the remaining brake fluid pressure regulation means $40_{FR}$, $40_{RL}$ and $40_{RR}$ of the wheels Wfr, Wrl and Wrr are configured similarly to the above-mentioned brake fluid pressure regulation means $40_{FL}$ of the left front wheel Wfl. In other words, the brake fluid pressure regulation means $40_{FR}$ of the right front wheel Wfr includes a pressure increasing valve $NO_{FR}$, a pressure reducing valve $NC_{FR}$ and a check valve $41_{FR}$, and realizes the pressure increase mode, the holding mode, or the pressure reduction mode of brake fluid pressure control over the braking force generation means $50_{FR}$, connected via a right front wheel passage $109_{FR}$, of the right front wheel Wfr. Moreover, the brake fluid pressure regulation means $40_{RL}$ of the left rear wheel Wrl includes a pressure increasing valve $NO_{RL}$ a pressure reducing valve $NC_{RL}$ and a check valve $41_{RL}$, and realizes the pressure increase mode, the holding mode, or the pressure reduction mode of brake fluid pressure control over the braking force generation means $50_{RL}$, connected via a left rear wheel passage $109_{RL}$, of the left rear wheel Wrl. Moreover, the brake fluid pressure regulation means $40_{RR}$ of the right rear wheel Wrr includes a pressure increasing valve $NO_{RR}$, a pressure reducing valve $NC_{RR}$ and a check valve $41_{RR}$, and realizes the pressure increase mode, the holding mode, or the pressure reduction mode of brake fluid pressure control over the braking force generation means $50_{RR}$, connected via a right rear wheel passage $109_{RR}$, of the right rear wheel Wrr.

Brake control means of the first embodiment performs pulse control, specifically PWM (Pulse Width Modulation) control on the pressure increasing valve $NO_{FL}$, $NO_{FR}$, $NO_{RL}$ or $NO_{RR}$ and the pressure reducing valve $NC_{FL}$, $NC_{FR}$, $NC_{RL}$ or $NC_{RR}$, which are subjected to control, when performing ABS control and the like, and regulates the brake fluid pressure to the braking force generation means $50_{FL}$, $50_{FR}$, $50_{RL}$ or $50_{RR}$ (that is, the wheel cylinder pressure Pwc). Upon the regulation, the current value and the duty ratio of the applied rectangular wave current to the pressure increasing valve $NO_{FL}$, $NO_{FR}$, $NO_{RL}$ or $NO_{RR}$ and the pressure reducing valve $NC_{FL}$, $NC_{FR}$, $NC_{RL}$ or $NC_{RR}$ are designated to realize a target pressure increase amount ΔPt or a target pressure reduction amount ΔPt by controlling the valve opening degree, the valve open time, and the valve close time.

Figure 2:
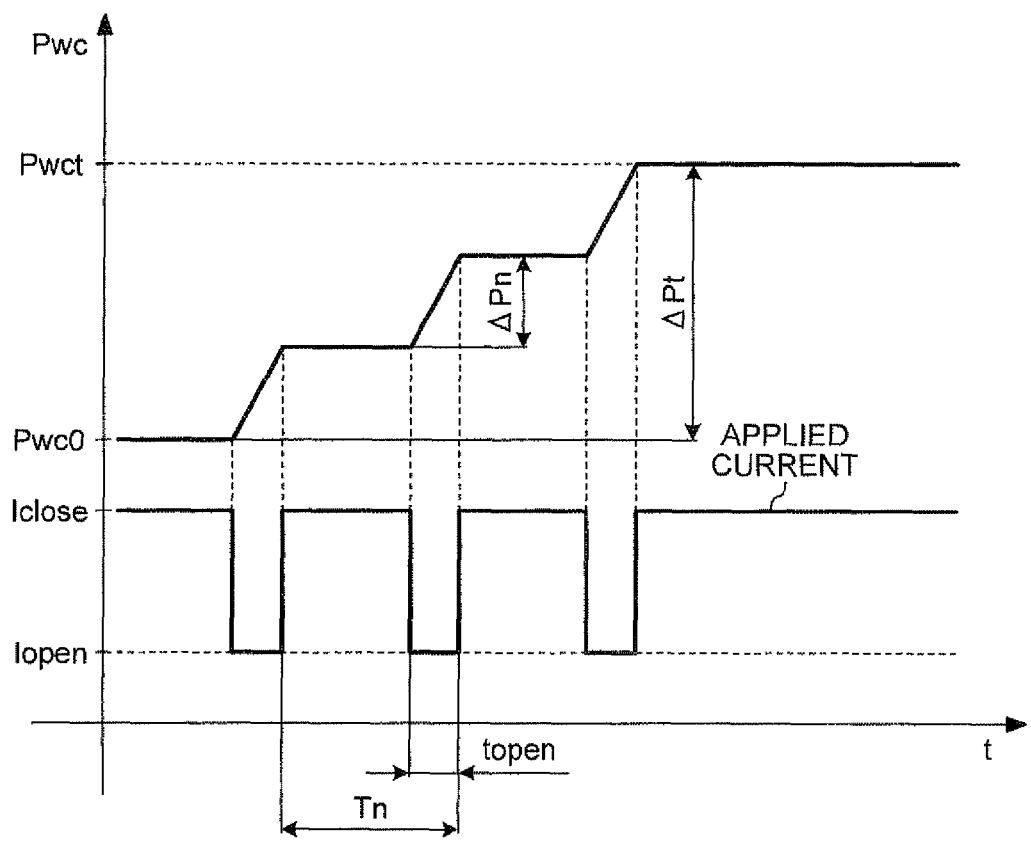
FIG. 2 is a view illustrating a relationship between applied current and wheel cylinder pressure at the time of slow pressure increase.

For example, a description will be given taking an example of the pressure increase mode of the left front wheel Wfl. As shown in FIG. 2, upon request to increase pressure by a target pressure increase amount ΔPt (=Pwct−Pwc0) from the current wheel cylinder pressure Pwc0 to a target wheel cylinder pressure Pwct, the brake fluid pressure control means of the electronic control unit 1 may repeatedly open and close the pressure increasing valve $NO_{FL}$, to gradually increase pressure (what is called slow pressure increase) by a desired pressure increase amount ΔPn (n=1, 2, ...) at each basic cycle Tn (n=1, 2, ...). Here, the pressure increasing valve $NO_{FL}$ is a normally opened solenoid valve, and accordingly, in order to realize the pressure increase amount ΔPn, is closed by applying current having the current value Iclose thereto, is caused to stay open at a valve opening degree in accordance with the current value Iopen until a valve open time topen elapses by applying current having the current value Iopen (<Iclose) after a lapse of a valve close time tclose, and is caused to pass the brake fluid with a volume satisfying the pressure increase amount ΔPn therethrough. The wheel cylinder pressure Pwc is increased to the target wheel cylinder pressure Pwct by repeating the opening and closing operations of the pressure increasing valve $NO_{FL}$ in the basic cycle Tn several times.

Here, the brake device for a vehicle of the first embodiment does not include means for detecting the wheel cylinder pressure Pwc in each of the wheels Wfl, Wfr, Wrl and Wrr; accordingly, it is necessary to use an estimated value for the wheel cylinder pressure Pwc. Therefore, the accuracy of information on the difference between the upstream brake fluid pressure and the downstream brake fluid pressure of the pressure increasing valve $NO_{FL}$, $NO_{FR}$, $NO_{RL}$ or $NO_{RR}$ (the differential pressure Pdiff between the master cylinder pressure Pmc and the wheel cylinder pressure Pwc; Pdiff=Pmc−Pwc) is not always high; accordingly, it is not possible to obtain appropriate applied current at the time when the valve is open (in other words, the appropriate current value Iopen and the valve open time topen at the time when the valve is open) by use of the information and the like by feedback control, and it is difficult to always realize an increase in pressure by a desired pressure increase amount ΔPn. Hence, in order to increase the wheel cylinder pressure Pwc by a desired pressure increase amount ΔPn at anytime, appropriate applied current to the pressure increasing valve $NO_{FL}$, $NO_{FR}$, $NO_{RL}$ or $NO_{RR}$ subjected to control, that enables the pressure increase, is obtained by feedforward control.

However, the appropriate current value Iopen and the valve open time topen at the time when the valve is open are determined depending on the magnitude of a desired pressure increase amount ΔPn, the brake fluid pressure on the upstream side of the pressure increasing valve $NO_{FL}$, $NO_{FR}$, $NO_{RL}$ or $NO_{RR}$ subjected to control (the master cylinder pressure Pmc) at each moment, the brake fluid pressure on the downstream thereof (the wheel cylinder pressure Pwc) at each moment, the characteristics of the valve opening degree of the pressure increasing valve $NO_{FL}$, $NO_{FR}$, $NO_{RL}$ or $NO_{RR}$ with respect to the current value I of the applied current, the volume stiffness Qf of the brake fluid in the brake device for a vehicle, and the like. The volume stiffness ΔQf of the brake fluid is the characteristic of the volume V of the brake fluid flowing through the pressure increasing valve $NO_{FL}$, $NO_{FR}$, $NO_{RL}$ or $NO_{RR}$, the volume being necessary to increase or reduce the wheel cylinder pressure Pwc shown in FIG. 3 (hereinafter referred to as "brake fluid passage volume"), and is indicated by the consumption volume of the brake fluid per unit pressure of the wheel cylinder pressure Pwc. Characteristic of the volume stiffness Qf changes in accordance with the magnitude of the wheel cylinder pressure Pwc. Since such a dependent relationship has nonlinearity shown below in the brake fluid passage flow rate Q and the like, it is difficult to build a feedforward system that can obtain appropriate applied current at the time when the valve is open in any situation. Even if it is possible to build such a feedforward system for a specific type of car, it is difficult to apply the feedforward system to a type of car that has a different volume stiffness Qf.

Figure 3:
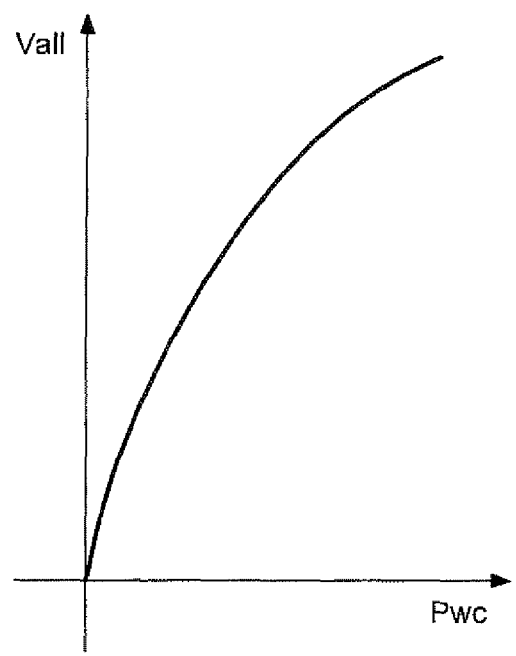
FIG. 3 is a view illustrating a relationship between a total brake fluid passage volume and the wheel cylinder pressure.
Figure 4:
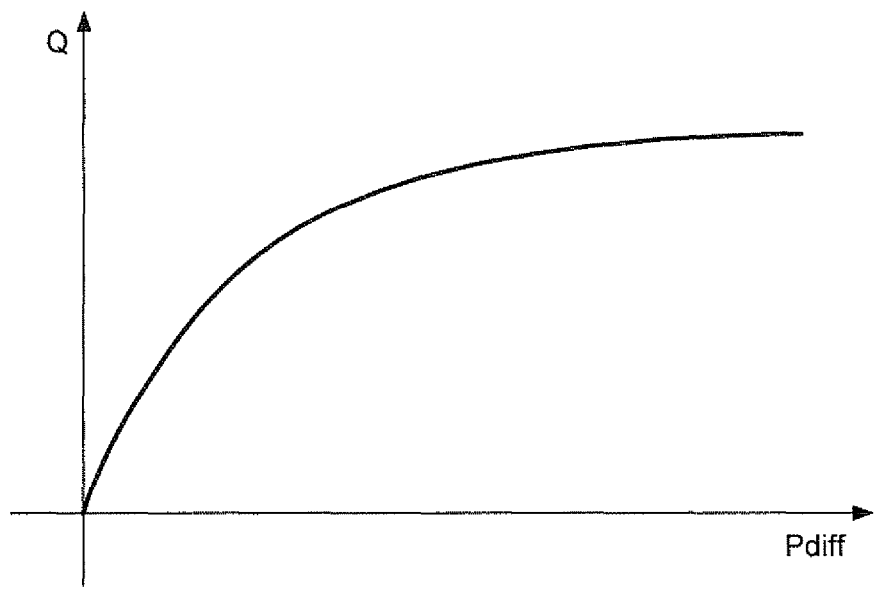
FIG. 4 is a view illustrating a relationship between a brake fluid passage flow rate and differential pressure.
Figure 5:
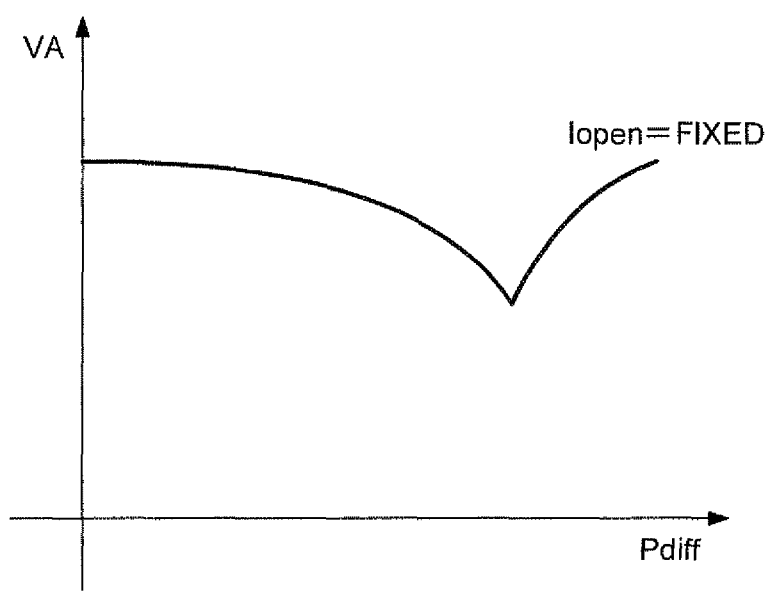
FIG. 5 is a view illustrating a relationship between a valve opening degree and differential pressure at the time when the current value is fixed at the time when the valve is open.

For example, as shown in FIG. 3, a total brake fluid passage volume Vall through the pressure increasing valve $NO_{FL}$, $NO_{FR}$, $NO_{RL}$ or $NO_{RR}$ is dependent on the downstream brake fluid pressure (the wheel cylinder pressure Pwc) and has a nonlinear (that is, quadratic functional) relationship with the wheel cylinder pressure Pwc. Therefore, there is a possibility that there arises a difference between a necessary brake fluid passage volume Vt of the pressure increasing valve $NO_{FL}$, $NO_{FR}$, $NO_{RL}$ or $NO_{RR}$ necessary to realize a desired pressure increase amount ΔPn and a brake fluid passage volume Vr that actually flows therethrough. The total brake fluid passage volume Vall indicates the total of the brake fluid passage volumes V that flow through the pressure increasing valve $NO_{FL}$, $NO_{FR}$, $NO_{RL}$ or $NO_{RR}$ during a period from a starting point (t=0) to a certain time or when realizing a certain pressure increase amount ΔPn. Moreover, the brake fluid passage flow rate Q that is the difference between the upstream brake fluid pressure and the downstream brake fluid pressure of the pressure increasing valve $NO_{FL}$, $NO_{FR}$, $NO_{RL}$ or $NO_{RR}$ (the differential pressure Pdiff between the master cylinder pressure Pmc and the wheel cylinder pressure Pwc) is dependent on a valve opening degree VA of the pressure increasing valve $NO_{FL}$, $NO_{FR}$, $NO_{RL}$ or $NO_{RR}$, and has a nonlinear (that is, quadratic functional) relationship with the differential pressure Pdiff as shown in FIG. 4. The brake fluid passage flow rate Q indicates the brake fluid passage volume V that flows through the pressure increasing valve $NO_{FL}$, $NO_{FR}$, $NO_{RL}$ or $NO_{RR}$ within a unit time, and has a relationship of "V=Q*t" with the brake fluid passage volume V. Moreover, if the current value Iopen of applied current to the pressure increasing valve $NO_{FL}$, $NO_{FR}$, $NO_{RL}$ or $NO_{RR}$ at the time when the valve is open is kept fixed, the valve opening degree VA of the pressure increasing valve $NO_{FL}$, $NO_{FR}$, $NO_{RL}$ or $NO_{RR}$ has a nonlinear relationship with the above differential pressure Pdiff as shown in FIG. 5. Here, the valve opening degree VA becomes smaller nonlinearly (in a quadratic functional manner) with increase in the differential pressure Pdiff, and the valve opening degree VA becomes larger nonlinearly (in a quadratic functional manner) at a certain point with increase in the differential pressure Pdiff. This is because the relationship between the current value I and the characteristic of the valve opening degree of the pressure increasing valve $NO_{FL}$, $NO_{FR}$, $NO_{RL}$ or $NO_{RR}$ is dependent on the brake fluid pressure on the upstream side of the pressure increasing valve $NO_{FL}$, $NO_{FR}$, $NO_{RL}$ or $NO_{RR}$ (the master cylinder pressure Pmc), the brake fluid pressure on the downstream side thereof (the wheel cylinder pressure Pwc), and the pulse width of applied current to the pressure increasing valve $NO_{FL}$, $NO_{FR}$, $NO_{RL}$ or $NO_{RR}$.

Hence, in the first embodiment, appropriate applied current at the time when the valve is open for realizing the pressure increase amount ΔPn is determined as shown below.

Here, in the first embodiment, a description will be given on a case where the pulse width WP at the time when the valve is open at each cycle in applied rectangular wave current (hereinafter referred to as "valve open pulse width"), in other words, the valve open time topen in each basic cycle Tn is kept fixed to slowly increase pressure. Moreover, in the first embodiment, a description will be given assuming that a desired pressure increase amount ΔPn in the basic cycle Tn is predetermined.

If the valve open time topen in the basic cycle Tn of each of the pressure increasing valves $NO_{FL}$, $NO_{FR}$, $NO_{RL}$ and $NO_{RR}$ in is kept fixed, it is necessary to pass the brake fluid with a volume satisfying the pressure increase amount ΔPn through the pressure increasing valve $NO_{FL}$, $NO_{FR}$, $NO_{RL}$ or $NO_{RR}$ during the valve open time topen to increase the wheel cylinder pressure Pwc by a desired pressure increase amount ΔPn in the basic cycle Tn. Hence, to achieve this, the brake fluid with a volume that can realize an increase in pressure by the pressure increase amount ΔPn needs to be passed to the downstream side by opening the pressure increasing valve $NO_{FL}$, $NO_{FR}$, $NO_{RL}$ or $NO_{RR}$ at a fixed valve opening degree VA1 while the valve open pulse width Wp (the valve open time topen) is fixed (hereinafter referred to as "fixed valve opening degree at the time when the valve open pulse width is fixed"). The fixed valve opening degree VA1 at the time when the valve open pulse width is fixed indicates a valve opening degree that brings the brake fluid passage flow rate Q through the pressure increasing valve $NO_{FL}$, $NO_{FR}$, $NO_{RL}$ or $NO_{RR}$ to a certain volume in accordance with the master cylinder pressure Pmc and the wheel cylinder pressure Pwc even under various conditions. For example, the brake fluid passage flow rate Q is expressed by the following mathematical formula 1 by use of the master cylinder pressure Pmc, the wheel cylinder pressure Pwc, the valve open time topen in the basic cycle Tn, and a flow coefficient Kv (here, a fixed value). The flow coefficient Kv indicates, so to speak, the brake fluid passage flow rate Q (that is, the ease of flow) through the pressure increasing valve $NO_{FL}$, $NO_{FR}$, $NO_{RL}$ or $NO_{RR}$, and varies in accordance with the valve opening degree VA.

$$Q = topen * Kv\sqrt{Pmc - Pwc} \quad (1)$$

Figure 6:
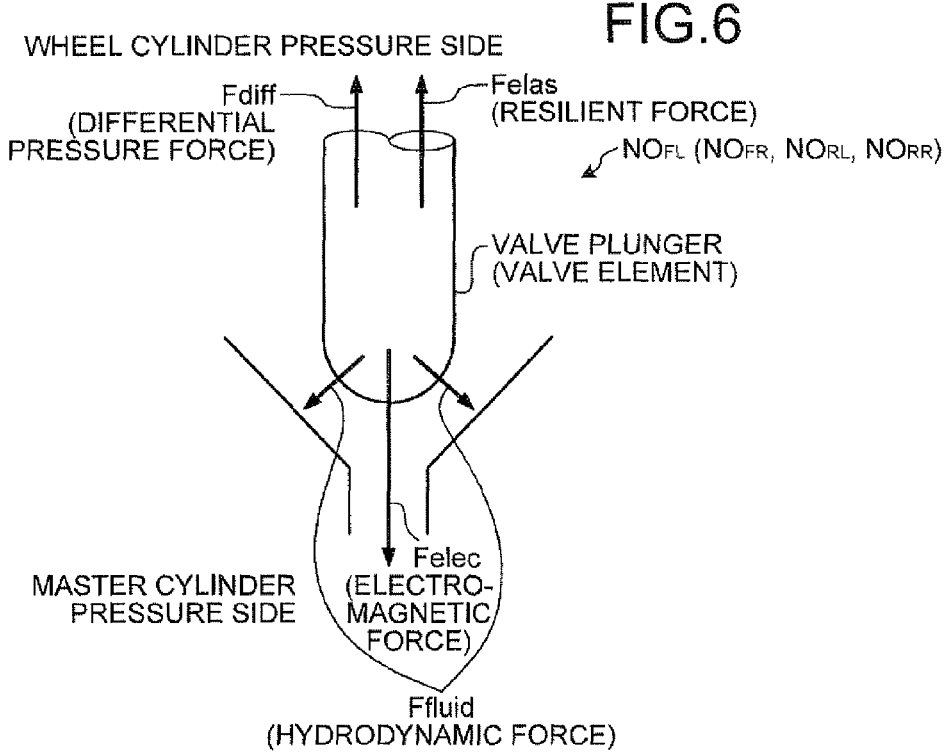
FIG. 6 is a view explaining force working on a valve element of a pressure increasing valve.

However, as shown in FIG. 6, not only a force Fdiff in a valve opening direction acting due to the difference between the upstream brake fluid pressure and the downstream brake fluid pressure (the differential pressure Pdiff between the master cylinder pressure Pmc and the wheel cylinder pressure Pwc) (hereinafter referred to as "differential pressure force") but also the following force that varies nonlinearly in accordance with the magnitude of the differential pressure Pdiff acts on the valve element of the pressure increasing valve $NO_{FL}$, $NO_{FR}$, $NO_{RL}$ or $NO_{RR}$ at the time when the valve is open in pressure increase mode. Therefore, the valve opening degree VA deviates nonlinearly relative to an opening amount in accordance with the differential pressure Pdiff at the pressure increasing valve $NO_{FL}$, $NO_{FR}$, $NO_{RL}$ or $NO_{RR}$. Hence, unless the current value Iopen of the applied current at the time when the valve is open is determined considering the nonlinear force, it is difficult for the pressure increasing valve $NO_{FL}$, $NO_{FR}$, $NO_{RL}$ or $NO_{RR}$ to be fixed at the appropriate fixed valve opening degree VA1 at the time when the valve open pulse width is fixed for realizing a desired pressure increase amount ΔPn. The electronic control unit 1 is provided with differential pressure obtaining means for obtaining information on the differential pressure Pdiff between the master cylinder pressure Pmc and the wheel cylinder pressure Pwc based on the upstream brake fluid pressure and the downstream brake fluid pressure of the pressure increasing valve $NO_{FL}$, $NO_{FR}$, $NO_{RL}$ or $NO_{RR}$ subjected to control.

Here, the force that varies nonlinearly in accordance with the magnitude of the differential pressure Pdiff is the force Ffluid induced in the valve element by the flow of the brake fluid that passes through the pressure increasing valve $NO_{FL}$, $NO_{FR}$, $NO_{RL}$ or $NO_{RR}$ (hereinafter referred to as "hydrodynamic force"), and indicates the sum of the force in both of the valve opening and closing directions acting on the valve element by the flow of the brake fluid. The electronic control unit 1 is provided with hydrodynamic force obtaining means for obtaining information on the hydrodynamic force Ffluid that is the nonlinear force. The hydrodynamic force Ffluid is the force working in the operation direction of the valve element (here, the valve closing direction), but is the force acting in a direction orthogonal to the flow line direction of the brake fluid flowing between the valve element and a valve seat, and accordingly is illustrated by arrows in the oblique directions in FIG. 6 for convenience.

Figure 7:
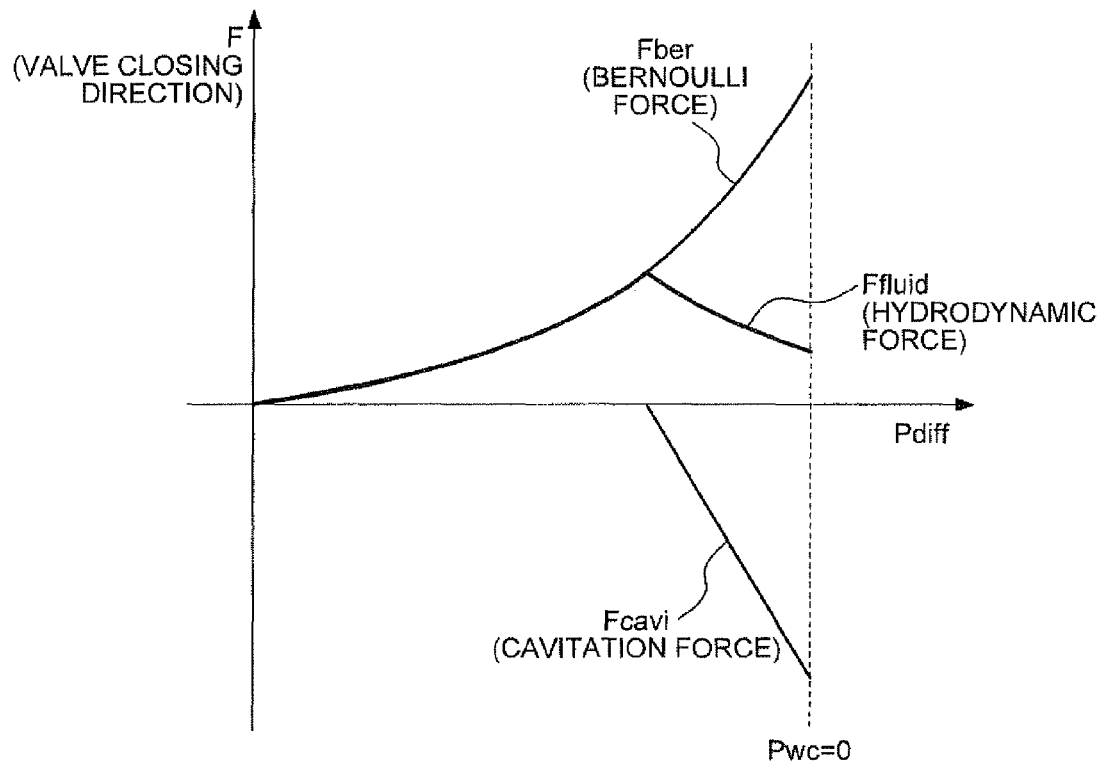
FIG. 7 is a view explaining Bernoulli force and cavitation force, which constitute hydrodynamic force.

Specifically, in the pressure increasing valves $NO_{FL}$, $NO_{FR}$, $NO_{RL}$ and $NO_{RR}$, the flow velocity of the brake fluid passing therethrough becomes higher with increase in the differential pressure Pdiff, and therefore the negative pressure between the valve element and the valve seat increases; accordingly, the force attracting the valve element to the valve seat (what is called Bernoulli force Fber) increases as shown in FIG. 7. In other words, the Bernoulli force Fber as the force in the valve closing direction acts on the valve element by the flow of the brake fluid passing through the pressure increasing valve $NO_{FL}$, $NO_{FR}$, $NO_{RL}$ or $NO_{RR}$. The Bernoulli force Fber is proportional to the square of the differential pressure Pdiff, and is computed by the hydrodynamic force obtaining means.

Moreover, in the pressure increasing valves $NO_{FL}$, $NO_{FR}$, $NO_{RL}$ and $NO_{RR}$, the flow velocity of the brake fluid becomes higher with increase in the differential pressure Pdiff. If the flow velocity becomes higher than a certain flow velocity, cavitation may occur. When the cavitation occurs, the volume of the brake fluid between the valve element and the valve seat expands, and the force Fcavi pulling the valve element apart from the valve seat (hereinafter referred to as "cavitation force") occurs. As shown in FIG. 7, the cavitation force Fcavi increases in the valve opening direction as the differential pressure Pdiff increases. In other words, the cavitation force Fcavi as the force in the valve opening direction acts on the valve element by the flow of the brake fluid passing through the pressure increasing valve $NO_{FL}$, $NO_{FR}$, $NO_{RL}$ or $NO_{RR}$. The cavitation force Fcavi is proportional to the differential pressure Pdiff, is inversely proportional to the downstream brake fluid pressure (the wheel cylinder pressure Pwc), and is computed by the hydrodynamic force obtaining means.

In this manner, the Bernoulli force Fber and the cavitation force Fcavi work on the valve element by the flow of the brake fluid passing through the pressure increasing valve $NO_{FL}$, $NO_{FR}$, $NO_{RL}$ or $NO_{RR}$, and the sum of the forces forms the hydrodynamic force Ffluid. Hence, the hydrodynamic force obtaining means of the electronic control unit 1 calculates the information on each of the Bernoulli force Fber and the cavitation force Fcavi to obtain information on the hydrodynamic force Ffluid. Here, when considering the absolute values, the Bernoulli force Fber is illustrated to be larger than the cavitation force Fcavi. Therefore, the hydrodynamic force Ffluid here acts on the valve element as the force in the valve closing direction.

Furthermore, in the pressure increasing valves $NO_{FL}$, $NO_{FR}$, $NO_{RL}$ and $NO_{RR}$ illustrated here, the force different from these forces also acts on the valve element. The pressure increasing valves $NO_{FL}$, $NO_{FR}$, $NO_{RL}$ and $NO_{RR}$ each include an unillustrated elastic body such as a spring that pushes the valve element in the valve opening direction, in between with the valve seat. This causes the elastic force (resilient force Felas) toward the valve opening direction caused to act on the valve element, and generates a valve open state when current is not applied to or current having the current value Iopen is applied to the solenoid. The electronic control unit 1 is provided with elastic force obtaining means for obtaining information on the resilient force Felas.

Here, the elastic body maintains contact with the valve element in the same location, and the space between the valve element and the valve seat does not dramatically change; accordingly, the resilient force Felas with the magnitude substantially equal regardless of the space is generated. Therefore, it is possible to previously grasp the resilient force Felas as a fixed value from the specifications (such as a spring constant of the elastic body) of the pressure increasing valve $NO_{FL}$, $NO_{FR}$, $NO_{RL}$ or $NO_{RR}$, and causes the elastic force obtaining means to read the value from storage means or the like. On the other hand, strictly speaking, as the valve opening degree VA of the pressure increasing valve $NO_{FL}$, $NO_{FR}$, $NO_{RL}$ or $NO_{RR}$ becomes smaller, the resilient force Felas increases. Hence, if higher accuracy is to be sought, the resilient force Felas may be a variable in accordance with the valve opening degree VA. For example, as the difference between the upstream brake fluid pressure and the downstream brake fluid pressure (if the upstream side>the downstream side) of the pressure increasing valve $NO_{FL}$, $NO_{FR}$, $NO_{RL}$ or $NO_{RR}$ becomes smaller, the valve opening degree VA also becomes smaller; accordingly, the elastic force obtaining means may change the resilient force Felas in accordance with the difference of the brake fluid pressure.

Here, the elastic body was illustrated as one that pushes the valve element in the valve opening direction; however, the elastic body may be one that pulls the valve element in the valve opening direction.

Furthermore, in the pressure increasing valve $NO_{FL}$, $NO_{FR}$, $NO_{RL}$ or $NO_{RR}$, it is possible to cause electromagnetic force Felec in the valve closing direction in accordance with the magnitude of the current value I to act on the valve element by applying current to the solenoid.

In this manner, not only the differential pressure force Fdiff in the valve opening direction, but also the cavitation force Fcavi and the resilient force Felas in the same valve opening direction, and the Bernoulli force Fber in the valve closing direction act on the valve element of the pressure increasing valve $NO_{FL}$, $NO_{FR}$, $NO_{RL}$ or $NO_{RR}$. The pressure increasing valve $NO_{FL}$, $NO_{FR}$, $NO_{RL}$ or $NO_{RR}$ is opened at a desired fixed valve opening degree VA1 at the time when the valve open pulse width is fixed in a state where the differential pressure force Fdiff, the cavitation force Fcavi, the resilient force Felas, and the Bernoulli force Fber act on the valve elements. Moreover, the electromagnetic force Felec in the valve closing direction can be caused to act on the valve element. Hence, in order to hold the fixed valve opening degree VA1 in a state where the hydrodynamic force Ffluid that is the nonlinear force is acting on the valve element, the electromagnetic force Felec in a state of being opened at the fixed valve opening degree VA1 is adjusted to an optimum magnitude to balance the forces in the valve opening and closing directions to act on the valve element as in the following mathematical formula 2. In other words, to achieve this, it is necessary to cause the electromagnetic force Felec against the above forces (the force obtained by the right term of the following mathematical formula 3) to act on the valve element in a state of being set to a desired fixed valve opening degree VA1 at the time when the valve open pulse width is fixed.

$$Felec+Fber=Fdiff+Felas+Fcavi \quad (2)$$

$$Felec=Fdiff+Felas-Fber+Fcavi \quad (3)$$

Moreover, from another viewpoint, in order to hold at a desired fixed valve opening degree VA1 at the time when the valve open pulse width is fixed, it is necessary to apply electromagnetic pressure Pelec against the pressure obtained by the right term to the valve element in a state of being set to the fixed valve opening degree VA1 based on the following mathematical formula 4 where pressure conversion is performed on mathematical formula 3. The electromagnetic pressure Pelec is the pressure working on the valve element by the electromagnetic force Felec.

$$Pelec=Pdiff+Pelas-Pber+Pcavi \quad (4)$$

In other words, the force or pressure that can be obtained by the right term of each of the mathematical formulae 3 and 4 is caused to act when the valve element is held at the above fixed valve opening degree VA1 at the time when the valve open pulse width is fixed, and the force or pressure in the valve closing direction against the force or pressure is caused to act on the valve element as the electromagnetic force Felec or the electromagnetic pressure Pelec; accordingly, it is possible to hold the valve element in a location that forms the fixed valve opening degree VA1 at the time when the valve open pulse width is fixed in the pressure increasing valve $NO_{FL}$, $NO_{FR}$, $NO_{RL}$ or $NO_{RR}$ subjected to control. Therefore, the applied current at the time when the valve is open when the electromagnetic force Felec or the electromagnetic pressure Pelec (an appropriate current value Iopen at the time when the valve is open since the valve open time topen is fixed) can be generated is obtained to output the applied current; accordingly, the pressure increasing valve $NO_{FL}$, $NO_{FR}$, $NO_{RL}$ or $NO_{RR}$ stays open at the fixed valve opening degree VA1 at the time when the valve open pulse width is fixed only for the valve open time topen. Hence, the brake fluid flowing from the upstream side to the downstream side for the valve open time topen increases the downstream brake fluid pressure of the pressure increasing valve $NO_{FL}$, $NO_{FR}$, $NO_{RL}$ or $NO_{RR}$ (the wheel cylinder pressure Pwc) by a desired pressure increase amount ΔPn.

Here, as described above, "Pdiff" in mathematical formula 4 indicates the difference between the upstream brake fluid pressure and the downstream brake fluid pressure of the pressure increasing valve $NO_{FL}$, $NO_{FR}$, $NO_{RL}$ or $NO_{RR}$ subjected to control (the differential pressure Pdiff between the master cylinder pressure Pmc and the wheel cylinder pressure Pwc), and is obtained based on the following mathematical formula 5.

$$Pdiff=Pmc-Pwc \quad (5)$$

The differential pressure obtaining means of the electronic control unit 1 obtains a present value of the differential pressure Pdiff at the time of computation. Here, the brake control device of the first embodiment is provided with upstream brake fluid pressure obtaining means and downstream brake fluid pressure obtaining means for obtaining information on the upstream brake fluid pressure and the downstream brake fluid pressure of the pressure increasing valves $NO_{FL}$, $NO_{FR}$, $NO_{RL}$ and $NO_{RR}$, respectively. As the upstream brake fluid pressure obtaining means, one that detects or estimates the upstream brake fluid pressure can be considered. If the means is set to be detection means, a brake fluid pressure sensor is placed in a flow passage on the upstream side of the pressure increasing valves $NO_{FL}$, $NO_{FR}$, $NO_{RL}$ and $NO_{RR}$. If the means is set to be estimation means, it is placed as one of the arithmetic processing functions of the electronic control unit 1. In the first embodiment, the brake fluid pressure sensor 83 that can detect the master cylinder pressure Pmc is provided; accordingly, the information on the upstream brake fluid pressure is obtained by use of a present detection value of the brake fluid pressure sensor 83. On the other hand, similarly to the upstream brake fluid pressure obtaining means, the downstream brake fluid pressure obtaining means can be considered to be one that detects or estimates the downstream brake fluid pressure. If the downstream brake fluid pressure obtaining means is set to be detection means, a brake fluid pressure sensor is placed in a flow passage on the downstream sides of the pressure increasing valves $NO_{FL}$, $NO_{FR}$, $NO_{RL}$ and $NO_{RR}$, and if the means is set to be estimation means, it is placed as one of the arithmetic processing functions of the electronic control unit 1. In the first embodiment, means for detecting the wheel cylinder pressure Pwc is not provided; accordingly, downstream brake fluid pressure estimation means is provided in the electronic control unit 1. The downstream brake fluid pressure estimation means estimates the downstream brake fluid pressure (the wheel cylinder pressure Pwc) based on, for example, the past record of opening and closing the pressure increasing valve $NO_{FL}$, $NO_{FR}$, $NO_{RL}$ or $NO_{RR}$ subjected to control, in other words, the record of changes in the flows of the brake fluid or changes of increase and reduction in the brake fluid pressure accompanied by the valve opening operation and the valve closing operation. Hence, the differential pressure obtaining means of the first embodiment substitutes the detection value of the master cylinder pressure Pmc and the estimation value of the wheel cylinder pressure Pwc into the above mathematical formula 5, and obtains the difference between the upstream brake fluid pressure and the downstream brake fluid pressure of the pressure increasing valve $NO_{FL}$, $NO_{FR}$, $NO_{RL}$ or $NO_{RR}$ subjected to control (the differential pressure Pdiff between the master cylinder pressure Pmc and the wheel cylinder pressure Pwc).

"Pelas" in mathematical formula 4 indicates the pressure working on the valve element by the resilient force Felas, and is hereinafter referred to as resilient force correction value. The resilient force correction value Pelas is obtained by the elastic force obtaining means of the electronic control unit 1. As shown in the description of the resilient force Felas, if the resilient force Felas is considered to be a fixed value, it is possible to similarly consider the resilient force correction value Pelas to be a fixed value, too. Hence, a fixed constant Celas may be used for the resilient force correction value Pelas. Moreover, similarly, if higher accuracy is to be sought, the resilient force correction value Pelas (the constant Celas) may be changed.

"Pber" in mathematical formula 4 indicates the pressure working on the valve element by Bernoulli force Fber, and is hereinafter referred to as the Bernoulli force correction value. Here, the Bernoulli force Fber can be grasped as a specific value based on the specifications (a space between the valve element and the valve seat in accordance with the valve opening degree VA, and the like) of the pressure increasing valve $NO_{FL}$, $NO_{FR}$, $NO_{RL}$ or $NO_{RR}$, and varies in accordance with the differential pressure Pdiff as described above. Therefore, the Bernoulli force Fber is derived from, for example, the above-mentioned map data similarly to FIG. 7 to cause the hydrodynamic force obtaining means to obtain the Bernoulli force correction value Pber. Moreover, the Bernoulli force correction value Pber may be obtained by the hydrodynamic force obtaining means from the following mathematical formula 6 by use of the differential pressure Pdiff and a coefficient A. Here, as the space between the valve element and the valve seat becomes wider, in other words, as the valve opening degree VA becomes larger, the flow velocity of the brake fluid becomes higher. Therefore, as the valve opening degree VA becomes larger, the Bernoulli force Fber increases. Hence, here, the coefficient A that shows a larger value as the valve opening degree VA of the pressure increasing valve $NO_{FL}$, $NO_{FR}$, $NO_{RL}$ or $NO_{RR}$ becomes larger is used for adjustment. For example, the coefficient A may become larger as the difference between the upstream brake fluid pressure and the downstream brake fluid pressure (if the upstream brake fluid pressure>the downstream brake fluid pressure) of the pressure increasing valve $NO_{FL}$, $NO_{FR}$, $NO_{RL}$ or $NO_{RR}$ becomes larger.

$$Pber = Pdiff^2 * A \quad (6)$$

"Pcavi" in mathematical formula 4 indicates the pressure working on the valve element by the cavitation force Fcavi, and is hereinafter referred to as cavitation force correction value. Here, the cavitation force Fcavi can be grasped as a specific value based on the specifications (a space between the valve element and the valve seat in accordance with the valve opening degree VA, and the like) of the pressure increasing valve $NO_{FL}$, $NO_{FR}$, $NO_{RL}$ or $NO_{RR}$, and varies in accordance with the differential pressure Pdiff as described above. Therefore, the cavitation force Fcavi is derived from, for example, the above-mentioned map data similarly to FIG. 7 to cause the hydrodynamic force obtaining means to obtain the cavitation force correction value Pcavi. Moreover, the hydrodynamic force obtaining means may be caused to obtain a maximum value of the cavitation force correction value Pcavi as shown in the following mathematical formula 7 by use of the upstream brake fluid pressure of the pressure increasing valve $NO_{FL}$, $NO_{FR}$, $NO_{RL}$ or $NO_{RR}$ subjected to control (the master cylinder pressure Pmc), the downstream brake fluid pressure thereof (the wheel cylinder pressure Pwc), coefficients B and C, and a constant Ccavi. Here, as the valve opening degree VA becomes larger, the flow velocity of the brake fluid becomes higher and cavitation occurs easily. Hence, the cavitation force correction value Pcavi is adjusted with the coefficients B and C and the constant Ccavi, which vary in accordance with the valve opening degree VA of the pressure increasing valve $NO_{FL}$, $NO_{FR}$, $NO_{RL}$ or $NO_{RR}$.

$$Pcavi = \max(Pmc*B - Pwc*C + Ccavi, 0) \quad (7)$$

The sum of the Bernoulli force correction value Pber and the cavitation force correction value Pcavi is the pressure to act on the valve element by the hydrodynamic force Ffluid.

The brake control device of the first embodiment uses the differential pressure Pdiff, the resilient force correction value Pelas, the Bernoulli force correction value Pber and the cavitation force correction value Pcavi to set applied current to the pressure increasing valve $NO_{FL}$, $NO_{FR}$, $NO_{RL}$ or $NO_{RR}$ subjected to control. The electronic control unit 1 is provided with applied current setting means for setting the applied current.

Firstly, the applied current setting means substitutes a present differential pressure Pdiff, the resilient force correction value Pelas, and the Bernoulli force correction value Pber and the cavitation force correction value Pcavi, which are obtained based on the present differential pressure Pdiff, into the above mathematical formula 4, and obtains the electromagnetic pressure Pelec caused to act on the valve element to realize the fixed valve opening degree VA1. The applied current setting means then obtains the current value I, more specifically, the current value Iopen at the time when the valve is open, of applied current that generates the electromagnetic pressure Pelec. The applied current setting means may be configured to obtain the current value I (the current value Iopen at the time when the valve is open) of applied current that generates the electromagnetic force Felec in the above mathematical formula 3.

Here, the pressure increasing valve $NO_{FL}$, $NO_{FR}$, $NO_{RL}$ or $NO_{RR}$ has a specific corresponding relationship between the current value I of applied current and the motion of the valve element (in other words, the electromagnetic force Felec or the electromagnetic pressure Pelec caused to act on the valve element). Therefore, the corresponding relationship is prepared in advance as a characteristic map of the current value I and the electromagnetic force Felec or the electromagnetic pressure Pelec, and the applied current setting means checks the electromagnetic force Felec obtained by the above mathematical formula 3 or the electromagnetic pressure Pelec obtained by the above mathematical formula 4 against the characteristic map and obtains the current value I (the current value Iopen at the time when the valve is open) of applied current. The current value Iopen obtained in this manner is a value appropriate to realize a desired pressure increase amount ΔPn with the valve open pulse width Wp fixed to be a fixed value.

The brake fluid pressure control means applies current having the current value Iopen to the solenoid of the pressure increasing valve $NO_{FL}$, $NO_{FR}$, $NO_{RL}$ or $NO_{RR}$ subjected to control for the valve open time topen, opens the pressure increasing valve $NO_{FL}$, $NO_{FR}$, $NO_{RL}$ or $NO_{RR}$ at the fixed valve opening degree VA1 at the time when the valve open pulse width is fixed, and increases the downstream brake fluid pressure (the wheel cylinder pressure Pwc) by a desired pressure increase amount ΔPn. The brake fluid pressure control means then applies the current value Iclose at the time when the valve is closed after a lapse of the valve open time topen, and closes the valve only for the valve close time tclose. The current value Iclose at the time when the valve is closed is preset to the magnitude that definitely closes the pressure increasing valve $NO_{FL}$, $NO_{FR}$, $NO_{RL}$ or $NO_{RR}$. The brake fluid pressure control means repeats outputs in the basic cycles Tn of the applied current by the number of the output pulses, and repeatedly opens and closes the pressure increasing valve $NO_{FL}$, $NO_{FR}$, $NO_{RL}$ or $NO_{RR}$ subjected to control to slowly increase the wheel cylinder pressure Pwc by the pressure increase amount ΔPn to the target wheel cylinder pressure Pwct.

In the first embodiment, for example, the number of output pulses of applied current (the number of the basic cycles Tn of a rectangular wave) can be determined based on a desired pressure increase amount ΔPn and a target time period until the target pressure increase amount ΔPt is achieved.

As shown above, when the valve open pulse width Wp (the valve open time topen) per basic cycle Tn in applied rectangular wave current is fixed, the brake control device of the first embodiment considers not only the difference between the upstream brake fluid pressure and the downstream brake fluid pressure of the pressure increasing valve $NO_{FL}$, $NO_{FR}$, $NO_{RL}$ or $NO_{RR}$ subjected to control (the differential pressure Pdiff between the master cylinder pressure Pmc and the wheel cylinder pressure Pwc), but also other forces to act on the valve element, in other words, the resilient force of the elastic body, especially the Bernoulli force Fber and the cavitation force Fcavi, which vary nonlinearly in accordance with the differential pressure Pdiff, to obtain the current value Iopen at the time when the valve is open with high accuracy. The current value Iopen can hold the pressure increasing valve $NO_{FL}$, $NO_{FR}$, $NO_{RL}$ or $NO_{RR}$ subjected to control at the fixed valve opening degree VA1 at the time when the valve open pulse width is fixed regardless of the existence of the hydrodynamic force Ffluid (the Bernoulli force Fber and the cavitation force Fcavi) that varies nonlinearly in accordance with the differential pressure Pdiff. Therefore, according to the brake control device, it is possible to increase the wheel cylinder pressure Pwc by a desired pressure increase amount ΔPn in the basic cycle Tn by applying the current value Iopen only while the valve open pulse width WP (the valve open time topen) is fixed. Additionally, in the brake control device, the number of output pulses is set to an appropriate number, and pressure is repeatedly increased by a desired pressure increase amount ΔPn by the number of output pulses; accordingly, it is made possible to perform appropriate slow pressure increase control to reach the target wheel cylinder pressure Pwct. In this manner, according to the brake control device of the first embodiment, even if means for detecting the wheel cylinder pressure Pwc is not provided, it is possible to perform slow pressure increase control with high accuracy. Moreover, the brake control device can set the appropriate number of output pulses by changing the volume stiffness Qf according to the type of car, and therefore can be also easily applied to a different type of car by changing the volume stiffness Qf.

The above-mentioned present invention has been described taking an example in pressure increase mode, but may be applied in pressure reduction mode based on the similar idea. In other words, the differential pressure force Fdiff, the resilient force Felas and the Bernoulli force Fber act on the valve element of the pressure reducing valve $NC_{FL}$, $NC_{FR}$, $NC_{RL}$ or $NC_{RR}$ as the force in the valve closing direction, and the cavitation force Fcavi acts thereon as the force in the valve opening direction. Moreover, the electromagnetic force Felec in the valve opening direction can also be cause to act on the valve element. Therefore, in this case, while the pressure reducing valve $NC_{FL}$, $NC_{FR}$, $NC_{RL}$ or $NC_{RR}$ is set at a desired fixed valve opening degree VA1 at the time when the valve open pulse width is fixed, the electromagnetic force Felec or the electromagnetic pressure Pelec against the force or pressure obtained by the right term of the following mathematical formula 8 or 9 is caused to act on the valve element. Hence, here, appropriate applied current at the time when the valve is open (the appropriate current value Iopen at the time when the valve is open since the valve open time topen is fixed) that can generate the electromagnetic force Felec or the electromagnetic pressure Pelec is obtained and output, and therefore desired pressure reduction is made possible, and it is possible to obtain a similar effect.

$$Felec = Fdiff + Felas + Fber - Fcavi \quad (8)$$

$$Pelec = Pdiff + Pelas + Pber - Pcavi \quad (9)$$

Second Embodiment

Next, a description will be given on a second embodiment of a brake control device according to the present invention.

In the above-mentioned brake control device of the first embodiment, illustrated was the slow pressure increase control at the time when the valve open pulse width Wp (the valve open time topen) per basic cycle Tn of applied current is fixed in advance. In other words, in the brake control device of the first embodiment, even if the valve open pulse width Wp at each cycle is fixed, the number of output pulses of applied current is set to an appropriate number, and the fixed valve opening degree VA1 at the time when the valve open pulse width is fixed is regulated to an appropriate magnitude considering the hydrodynamic force Ffluid (the Bernoulli force Fber and the cavitation force Fcavi) that varies nonlinearly in accordance with the differential pressure Pdiff; accordingly, it is possible to slowly increase the wheel cylinder pressure Pwc to the target wheel cylinder pressure Pwct with high accuracy.

Here, the valve open pulse width Wp may be needed to be changed as will be described below.

For example, even if the fixed valve opening degree VA1 at the time when the valve open pulse width is fixed is set to a maximum valve opening degree while keeping a present valve open pulse width Wp, and the pressure increase amount ΔPn per basic cycle Tn is increased to a maximum, the brake fluid passage volume V may lack in the pressure increasing valve $NO_{FL}$, $NO_{FR}$, $NO_{RL}$ or $NO_{RR}$. In this case, the pressure increase amount ΔPn at each cycle does not reach a desired pressure increase amount ΔPn, and the total of the pressure increase amounts ΔPn of the cycles does not increase to the target pressure increase amount ΔPt; accordingly, it is not possible to increase the wheel cylinder pressure Pwc to the target wheel cylinder pressure Pwct. Moreover, when there is an upper limit on the number of control cycles of applied current (in other words, the number of output pulses of applied current), even if pressure is increased by a maximum pressure increase amount $\Delta$Pn at each cycle while keeping the present valve open pulse width Wp, the total of the pressure increase amounts $\Delta$Pn of the cycles may not increase to the target pressure increase amount $\Delta$Pt due to the lack of the number of output pulses, and it may not be possible to increase the wheel cylinder pressure Pwc to the target wheel cylinder pressure Pwct. Therefore, in these cases, for example, the valve open pulse width Wp is made longer by changing the duty ratio, and the brake fluid passage flow rate Q through the pressure increasing valve $NO_{FL}$, $NO_{FR}$, $NO_{RL}$ or $NO_{RR}$ is increased; accordingly, the wheel cylinder pressure Pwc is increased to the target wheel cylinder pressure Pwct. The maximum valve opening degree is determined by the specifications of the pressure increasing valve $NO_{FL}$, $NO_{FR}$, $NO_{RL}$ or $NO_{RR}$.

On the other hand, conversely, even if the fixed valve opening degree VA1 at the time when the valve open pulse width is fixed is set to a minimum valve opening degree while keeping the present valve opening pulse width Wp and the pressure increase amount $\Delta$Pn per basic cycle Tn is reduced as much as possible, the brake fluid passage volume V may be excessive. In this case, the pressure increase amount $\Delta$Pn at each cycle exceeds a desired pressure increase amount $\Delta$Pn, and the total of the pressure increase amounts $\Delta$Pn of the cycles increases more than the target pressure increase amount $\Delta$Pt; accordingly, the wheel cylinder pressure Pwc becomes higher than the target wheel cylinder pressure Pwct. Moreover, when there is a lower limit on the number of control cycles of applied current (the number of output pulses of applied current), even if pressure is increased by a minimum pressure increase amount $\Delta$Pn at each cycle while keeping the present valve open pulse width Wp, the total of the pressure increase amounts $\Delta$Pn of the cycles may increase more than the target pressure increase amount $\Delta$Pt due to the excessive number of output pulses, and the wheel cylinder pressure Pwc may become higher than the target wheel cylinder pressure Pwct. Therefore, in these cases, the valve open pulse width Wp is made shorter, and the brake fluid passage flow rate Q is reduced; accordingly, an increase in the wheel cylinder pressure Pwc is limited to an increase up to the target wheel cylinder pressure Pwct. The minimum valve opening degree is determined by the specifications of the pressure increasing valve $NO_{FL}$, $NO_{FR}$, $NO_{RL}$ or $NO_{RR}$.

In this manner, the valve open pulse width Wp of applied current may be needed to be changed. Hence, the brake control device of the second embodiment includes the applied current setting means in the above-mentioned brake control device of the first embodiment so as to enable a change in the valve open pulse width Wp (the valve open time topen). For example, the applied current setting means changes the valve open pulse width Wp so as to increase pressure to the target wheel cylinder pressure Pwct when it is not possible to realize an increase in pressure to the target wheel cylinder pressure Pwct due to the excess or lack of the pressure increase amount $\Delta$Pn at each cycle or the excess or lack of the number of output pulses.

Specifically, the applied current setting means, for example, estimates the valve opening degree VA based on the force or pressure obtained by the right term of the above mathematical formula 3 or 4 to obtain the brake fluid passage flow rate Q at this valve opening degree VA. On the other hand, the applied current setting means obtains a necessary brake fluid passage volume Vt necessary to increase pressure to the target wheel cylinder pressure Pwct. Moreover, the applied current setting means obtains settable basic cycles Tn as many as possible based on a target time period required to increase pressure to the target wheel cylinder pressure Pwct and the number of output pulses of applied current that can be output. The applied current setting means then obtains a brake fluid passage volume Vtn per basic cycle Tn that can realize the necessary brake fluid passage volume Vt, for each settable basic cycle Tn, and further obtains the valve open pulse width Wp for each settable basic cycle Tn based on the brake fluid passage volume Vtn per basic cycle Tn and the brake fluid passage flow rate Q, and sets the valve open pulse width Wp appropriate for slow pressure increase control for this time from among them.

The pressure increasing valve $NO_{FL}$, $NO_{FR}$, $NO_{RL}$ or $NO_{RR}$ illustrated here has a characteristic, for example, that even if the valve open pulse width Wp is doubled, the brake fluid passage flow rate Q is not similarly doubled, but increases more than that due to an excess of the valve opening degree VA. In the pressure increasing valve $NO_{FL}$, $NO_{FR}$, $NO_{RL}$ or $NO_{RR}$, for example, as the valve open pulse width Wp becomes longer relative to the valve open pulse width Wp0 that is a certain reference (hereinafter referred to as "reference valve open pulse width"), the amount of an excess of the valve opening degree VA increases. Therefore, when the valve open pulse width Wp is long, unless the amount of an excess of a brake fluid passage flow rate that increases in accordance with the excess of the valve opening degree VA is reduced, the brake fluid passage volume V truly required does not flow; accordingly, the pressure increasing valve $NO_{FL}$, $NO_{FR}$, $NO_{RL}$ or $NO_{RR}$ is not set to a desired valve opening degree VA, and the wheel cylinder pressure Pwc is increased more than a desired pressure increase amount $\Delta$Pn. The reference valve open pulse width Wp0 indicates a valve open pulse width at the time when the excess or lack of the valve opening degree VA does not occur, and is determined by the specifications of the pressure increasing valve $NO_{FL}$, $NO_{FR}$, $NO_{RL}$ or $NO_{RR}$.

Conversely, the pressure increasing valves $NO_{FL}$, $NO_{FR}$, $NO_{RL}$ and $NO_{RR}$ have a characteristic, for example, that even if the valve open pulse width Wp is halved, the brake fluid passage flow rate Q is not similarly halved, but the reduced amount becomes less than half due to the lack of the valve opening degree VA. In the pressure increasing valve $NO_{FL}$, $NO_{FR}$, $NO_{RL}$ or $NO_{RR}$, as the valve open pulse width Wp becomes shorter in relation to the reference valve open pulse width Wp0, the amount of the lack of the valve opening degree VA increases. Therefore, when the valve open pulse width Wp is short, unless the brake fluid passage volume is increased by the amount of the lack that increases in accordance with the lack of the valve opening degree VA, the brake fluid passage volume V truly required does not flow; accordingly, the pressure increasing valve $NO_{FL}$, $NO_{FR}$, $NO_{RL}$ or $NO_{RR}$ is not set to a desired valve opening degree VA, and the increase pressure amount of the wheel cylinder pressure Pwc does not reach a desired pressure increase amount $\Delta$Pn.

Factors responsible for these are considered to be responsiveness of the pressure increasing valves $NO_{FL}$, $NO_{FR}$, $NO_{RL}$ and $NO_{RR}$ themselves and of a circuit of applied current to the pressure increasing valves $NO_{FL}$, $NO_{FR}$, $NO_{RL}$ and $NO_{RR}$. The length of the valve open pulse width Wp and the excess or lack of the valve opening degree VA have a correlation with each other. Hence, in order to increase the wheel cylinder pressure Pwc by a desired pressure increase amount $\Delta$Pn, the current value Iopen of applied current at the time when the valve is open is corrected in accordance with the valve open pulse width Wp so as to have the brake fluid passage flow rate Q truly required, and the valve opening degree VA is controlled so as to have a desired magnitude without the excess or lack of the valve opening.

Accordingly, the brake control device of the second embodiment has a configuration to correct the current value Iopen of applied current at the time when the valve is open in accordance with the valve open pulse width Wp in addition to a configuration related to the setting of the valve open pulse width Wp as described above.

Specifically, it is configured to provide a correction value corresponding to the valve open pulse width Wp in the above mathematical formula 3 or 4 (the following mathematical formula 10 or 11), and to enable the correction of the electromagnetic force Felec or the electromagnetic pressure Pelec in the above mathematical formula 3 or 4 to an optimum magnitude in accordance with the valve open pulse width Wp, in other words, of the current value Iopen of applied current at the time when the valve is open obtained by the electromagnetic force Felec or the electromagnetic pressure Pelec in the above mathematical formula 3 or 4 to an optimum magnitude in accordance with the valve open pulse width Wp. The electromagnetic force Felec or the electromagnetic pressure Pelec obtained by mathematical formula 10 or 11 is for opening the pressure increasing valve $NO_{FL}$, $NO_{FR}$, $NO_{RL}$ or $NO_{RR}$ at a desired valve opening degree VA that does not cause the excess or lack of the valve opening, in accordance with the valve open pulse width Wp when caused to act on the valve element. "Cwpf" in mathematical formula 10 is correction force determined according to the valve open pulse width Wp (pulse width correction force). Moreover, "Cwpp" in mathematical formula 11 is correction pressure determined according to the valve open pulse width Wp (pulse width correction pressure).

$$Felec = Fdiff + Felas - Fber + Fcavi - Cwpf \quad (10)$$

$$Pelec = Pdiff + Pelas - Pber + Pcavi - Cwpp \quad (11)$$

In the second embodiment, as the valve open pulse width Wp becomes longer than the reference valve open pulse width Wp0, the electromagnetic force Felec or the electromagnetic pressure Pelec in the valve closing direction caused to act on the valve element is increased to have a desired valve opening degree VA that suppresses the excess of the valve opening. With regard to the pressure increasing valves $NO_{FL}$, $NO_{FR}$, $NO_{RL}$ and $NO_{RR}$ illustrated here, as the current value Iopen of applied current at the time when the valve is open increases, the electromagnetic force Felec or the electromagnetic pressure Pelec in the valve closing direction increases, and the valve elements operate in the valve closing direction. Therefore, as the valve open pulse width Wp is longer, the applied current setting means of the second embodiment corrects the current value Iopen at the time when the valve is open to a larger value, and increases the electromagnetic force Felec or the electromagnetic pressure Pelec by decreasing the valve opening degree VA by the amount of the excess of the valve opening to have a desired valve opening degree VA. Hence, as the valve open pulse width Wp is longer than the reference valve open pulse width Wp0, the pulse width correction force Cwpf and the pulse width correction pressure Cwpp are set to smaller values.

On the other hand, in the second embodiment, as the valve open pulse width Wp becomes shorter than the reference valve open pulse width Wp0, the electromagnetic force Felec or the electromagnetic pressure Pelec in the valve closing direction caused to act on the valve element is reduced to have a desired valve opening degree VA that has solved the lack of the valve opening. Therefore, as the valve open pulse width Wp is shorter, the applied current setting means of the second embodiment corrects the current value Iopen at the time when the valve is open to a smaller value, and reduces the electromagnetic force Felec or the electromagnetic pressure Pelec by increasing the valve opening degree VA by the amount of the lack of the valve opening to have a desired valve opening degree VA. Hence, as the valve open pulse width Wp is shorter than the reference valve open pulse width Wp0, the pulse width correction force Cwpf and the pulse width correction pressure Cwpp are set to larger values.

The pulse width correction force Cwpf or the pulse width correction pressure Cwpp for the valve open pulse width Wp needs to be previously provided as pulse width correction value map data based on the valve open pulse width Wp and the amount of the excess or lack of the valve opening degree VA. The pulse width correction force Cwpf or the pulse width correction pressure Cwpp does not vary with the influence of the upstream brake fluid pressure (the master cylinder pressure Pmc) and the downstream brake fluid pressure (the wheel cylinder pressure Pwc) of the pressure increasing valve $NO_{FL}$, $NO_{FR}$, $NO_{RL}$ or $NO_{RR}$.

The applied current setting means obtains the electromagnetic force Felec or the electromagnetic pressure Pelec that can open the valve at a desired valve opening degree VA with the valve open pulse width Wp set at that time by use of mathematical formula 10 or 11. Moreover, similarly to the first embodiment, the applied current setting means checks the electromagnetic force Felec or the electromagnetic pressure Pelec against the characteristic map (the characteristic map of the current value I and the electromagnetic force Felec or the electromagnetic pressure Pelec) and obtains the current value Iopen of applied current at the time when the valve is open. The brake fluid pressure control means then applies current having the current value Iopen to the solenoid of the pressure increasing valve $NO_{FL}$, $NO_{FR}$, $NO_{RL}$ or $NO_{RR}$ subjected to control only for the valve open pulse width Wp, opens the pressure increasing valve $NO_{FL}$, $NO_{FR}$, $NO_{RL}$ or $NO_{RR}$ at a desired valve opening degree VA, and increases the downstream brake fluid pressure of the pressure increasing valve $NO_{FL}$, $NO_{FR}$, $NO_{RL}$ or $NO_{RR}$ (the wheel cylinder pressure Pwc) by a desired pressure increase amount ΔPn without the excess or lack. The brake fluid pressure control means subsequently applies the current value Iclose at the time when the valve is closed, and keeps the pressure increasing valve $NO_{FL}$, $NO_{FR}$, $NO_{RL}$ or $NO_{RR}$ closed until the end of the valve close time tclose. The brake fluid pressure control means repeats outputs in the basic cycles Tn of the applied current by the number of output pulses to slowly increase the wheel cylinder pressure Pwc to the target wheel cylinder pressure Pwct.

Figure 8:
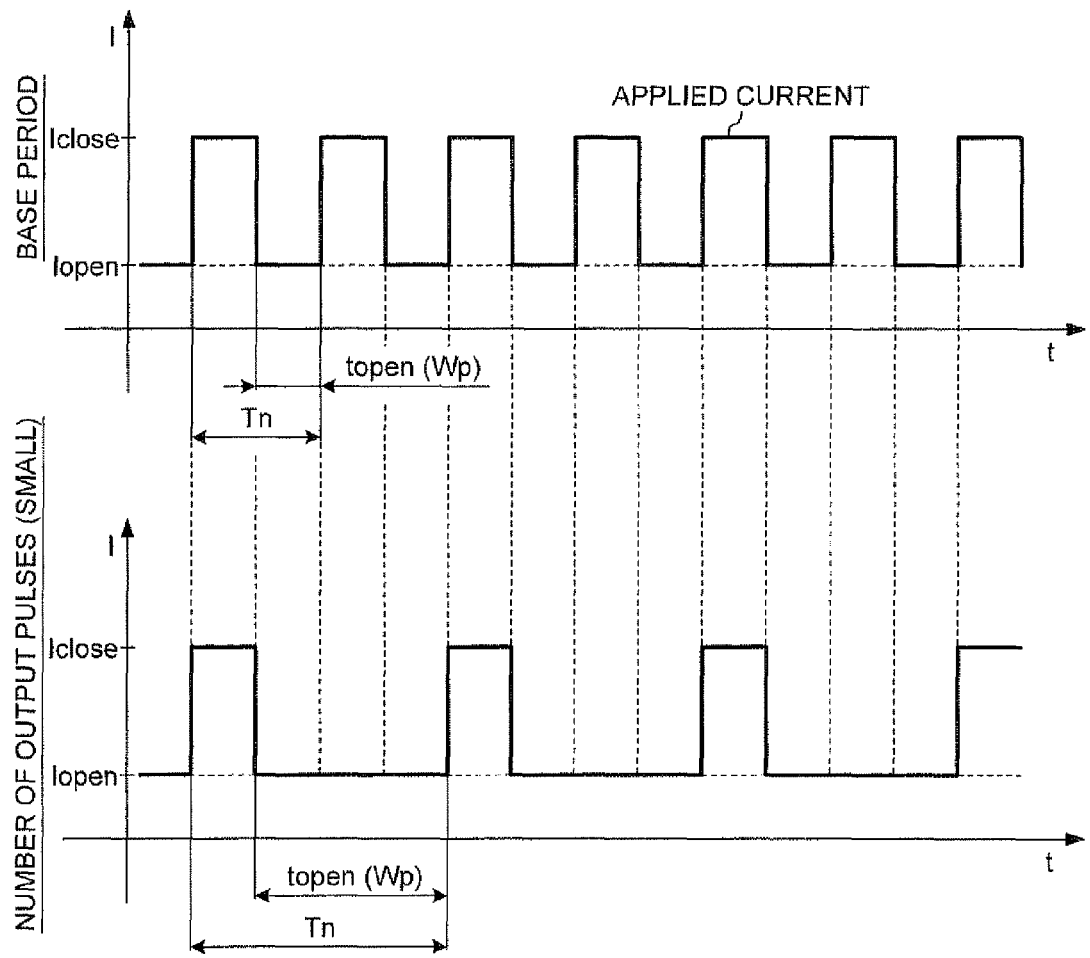
FIG. 8 is a view explaining applied current in a brake control device of a second embodiment.

For example, as shown in FIG. 8, if the number of output pulses needs to be decreased for a certain base period, the applied current setting means sets the valve open pulse width Wp longer than the base period. Upon the setting, the valve close time tclose is also obtained. Here, it is assumed that the wheel cylinder pressure Pwc is slowly increased within the same period as the base period. The applied current setting means then obtains the electromagnetic pressure Pelec (or the electromagnetic force Felec) in accordance with the valve open pulse width Wp, and computes the appropriate current value Iopen at the time when the valve is open for causing the electromagnetic pressure Pelec (or the electromagnetic force Felec) to act on the valve element. The brake fluid pressure control means subsequently applies the applied current (the current value Iopen at the time when the valve is open, the current value Iclose at the time when the valve is closed, the valve open pulse width Wp (the valve open time topen), the valve close time tclose) to the pressure increasing valve $NO_{FL}$, $NO_{FR}$, $NO_{RL}$ or $NO_{RR}$ subjected to control. Accordingly, the wheel cylinder pressure Pwc is increased by a desired pressure increase amount ΔPn. The brake fluid pressure control means performs slow pressure increase control on the wheel cylinder pressure Pwc by repeating them by the number of output pulses. In this manner, even if the number of output pulses decreases within the same period as the base period, the brake control device of the second embodiment can slowly increase the wheel cylinder pressure Pwc to the target wheel cylinder pressure Pwct by increasing the ratio of the valve open pulse width Wp (the pulse density Dp) under the slow pressure increase control, and correcting the excess or lack of the valve opening degree VA in accordance with the valve open pulse width Wp. Here, the pulse density Dp is derived, for example, by dividing the whole valve open time topen*n (n: the number of output pulses) by a time tall from the start to the end of the slow pressure increase control (DP=topen*n/tall). Also if the number of output pulses increases within the same period as the base period, the brake control device can slowly increase the wheel cylinder pressure Pwc as desired by changing the valve open pulse width Wp, that is, the pulse density Dp.

As shown above, the brake control device of the second embodiment obtains the appropriate electromagnetic force Felec or the electromagnetic pressure Pelec to the valve element so as to have a desired valve opening degree VA, further considering a correction value in accordance with the valve open pulse width Wp (the valve open time topen) in addition to the elements in the first embodiment. Moreover, the brake control device obtains the current value Iopen of applied current to the pressure increasing valve $NO_{FL}$, $NO_{FR}$, $NO_{RL}$ or $NO_{RR}$ subjected to control at the time when the valve is open based on the electromagnetic force Felec or the electromagnetic pressure Pelec where the length of the valve open pulse width Wp is considered. Therefore, even if the valve open pulse width Wp is changed, the brake control device can open the valve at a desired valve opening degree VA where the excess or lack of the opening degree is avoided by correcting the current value Iopen at the time when the valve is open to an appropriate value in accordance with the valve open pulse width Wp with good accuracy and applying it thereto. The brake control device then becomes possible to open the valve at the desired valve opening degree VA only for the valve open pulse width Wp (the valve open time topen), and accordingly can feed the brake fluid passage volume V truly required to the downstream side and increase the wheel cylinder pressure Pwc by a desired pressure increase amount ΔPn. Furthermore, in the brake control device, even if the number of output pulses of applied current is limited to the upper or lower limit by constraints on a control cycle, it is possible to realize an increase in pressure by a desired pressure increase amount ΔPn at each cycle by changing the valve open pulse width Wp and obtaining appropriate applied current in accordance with the changed valve open pulse width Wp. Hence, the brake control device becomes possible to perform appropriate slow pressure increase control for the target wheel cylinder pressure Pwct by repeating the pressure increase by the number of output pulses. In this manner, according to the brake control device of the second embodiment, even if means for detecting the wheel cylinder pressure Pwc is not provided, it is possible to perform slow pressure increase control with high accuracy.

The above-mentioned present invention has been described taking an example in pressure increase mode, but may be applied in pressure reduction mode based on the similar idea as described in the first embodiment. In other words, in this case, while the pressure reducing valve $NC_{FL}$, $NC_{FR}$, $NC_{RL}$ or $NC_{RR}$ is set to a desired valve opening degree VA, the electromagnetic force Felec or the electromagnetic pressure Pelec against the force or pressure obtained by the right term of the following mathematical formula 12 or 13 is caused to act on the valve element. Hence, here, appropriate applied current at the time when the valve is open that can generate the electromagnetic force Felec or the electromagnetic pressure Pelec is obtained and output, and therefore desired pressure reduction is made possible, and it is possible to obtain a similar effect.

$$Felec=Fdiff+Felas+Fber-Fcavi-Cwpf \quad (12)$$

$$Pelec=Pdiff+Pelas+Pber-Pcavi-Cwpp \quad (13)$$

Third Embodiment

Next, a description will be given on a third embodiment of a brake control device according to the present invention with reference to FIG. 9.

The brake control device of the third embodiment is configured in a manner where the pressure increasing valves $NO_{FL}$, $NO_{FR}$, $NO_{RL}$ and $NO_{RR}$ and the pressure reducing valves $NC_{FL}$, $NC_{FR}$, $NC_{RL}$ and $NC_{RR}$ each have a plurality stages of the valve opening degrees VA in the above-mentioned brake control device of the second embodiment. For example, the pressure increasing valve $NO_{FL}$, $NO_{FR}$, $NO_{RL}$ and $NO_{RR}$ illustrated here each have the valve opening degrees VA with three stages of large, medium and small, and can slowly increase the wheel cylinder pressure Pwc at the valve opening degree VA in any one of the opening degree stages.

As described in the first embodiment, in the pressure increasing valves $NO_{FL}$, $NO_{FR}$, $NO_{RL}$ and $NO_{RR}$, the flow coefficient Kv varies in accordance with the valve opening degree VA. Moreover, the values of the resilient force correction value Pelas (=the constant Celas), the coefficients A, B and C, and the constant Ccavi vary in accordance with the valve opening degree VA. Therefore, in the brake control device of the third embodiment, information on the flow coefficient Kv, the resilient force correction value Pelas (=the constant Celas), the coefficients A, B and C, and the constant Ccavi corresponding to each valve opening degree VA is previously stored in storage means such as a ROM.

Figure 9:
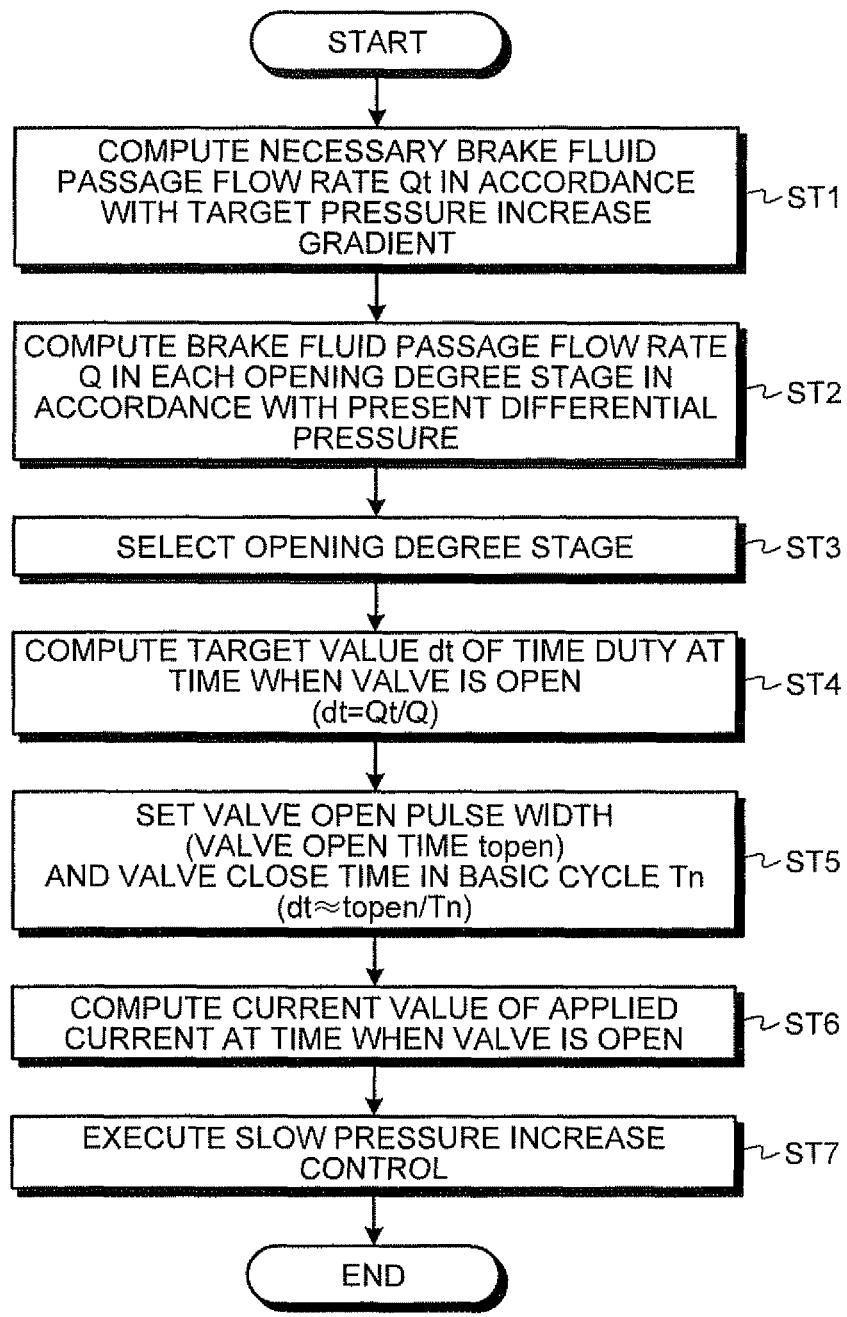
FIG. 9 is a flowchart explaining slow pressure increase control operations in a brake control device of a third embodiment.

In the brake control device including this type of the pressure increasing valves $NO_{FL}$, $NO_{FR}$, $NO_{RL}$ and $NO_{RR}$, the slow pressure increase control is performed as shown in the flowchart in FIG. 9.

Firstly, the brake control device obtains a brake fluid passage flow rate Qt necessary to realize a slow pressure increase with a target pressure increase gradient S under the slow pressure increase control (hereinafter referred to as "necessary brake fluid passage flow rate") (Step ST1). The electronic control unit 1 is provided with brake flow rate obtaining means for obtaining information on the necessary brake fluid passage flow rate Qt. For example, the brake flow rate obtaining means is provided as means for computing the necessary brake fluid passage flow rate Qt. The necessary brake fluid passage flow rate Qt is obtained by multiplying the volume stiffness Qf of the brake fluid in accordance with the wheel cylinder pressure Pwc by the target pressure increase gradient S (Qt=S*Qf) based on the target pressure increase gradient S, the volume stiffness Qf of the brake fluid previously stored, and the present downstream brake fluid pressure of the pressure increasing valve $NO_{FL}$, $NO_{FR}$, $NO_{RL}$ or $NO_{RR}$ (the wheel cylinder pressure Pwc), for example.

Here, the target pressure increase gradient S indicates a pressure increase amount per unit time of the wheel cylinder pressure Pwc under the slow pressure increase control, and indicates a target value usually output by the control such as ABS and the traction control system (TRC) in accordance with a vehicle. The electronic control unit 1 is provided with target pressure increase gradient setting means, and the target pressure increase gradient setting means reads a relevant target pressure increase gradient S from the storage means or the like in the former case, and determines and sets a target pressure increase gradient S based on the differential pressure Pdiff and the like in the latter case.

Moreover, the brake flow rate obtaining means obtains the brake fluid passage flow rate Q in each opening degree stage in accordance with present differential pressure Pdiff based on the difference between the present upstream brake fluid pressure and downstream brake fluid pressure of the pressure increasing valve $NO_{FL}$, $NO_{FR}$, $NO_{RL}$ or $NO_{RR}$ subjected to control (the differential pressure Pdiff between the master cylinder pressure Pmc and the wheel cylinder pressure Pwc) and the above-mentioned flow coefficient Kv in accordance with the valve opening degree VA in each opening degree stage (Step ST2). The brake fluid passage flow rate Q is computed by use of the following mathematical formula 14. At that time, the differential pressure Pdiff is obtained by use of the master cylinder pressure Pmc detected by the brake fluid pressure sensor 83 and the wheel cylinder pressure Pwc estimated from the past record similarly to the first and second embodiments.

$$Q = Kv\sqrt{Pdiff} \tag{14}$$

The brake control device of the third embodiment compares the brake fluid passage flow rate Q in each opening degree stage with the necessary brake fluid passage flow rate Qt, and selects an opening degree stage corresponding to a minimum that satisfies the necessary brake fluid passage flow rate Qt among the brake fluid passage flow rates Q (Step ST3). The electronic control unit 1 is provided with opening degree stage setting means for selecting an opening degree stage and setting the selected opening degree stage as the opening degree stage of the pressure increasing valve $NO_{FL}$, $NO_{FR}$, $NO_{RL}$ or $NO_{RR}$ subjected to control. For example, it is assumed that the brake fluid passage flow rates Q are set, respectively, to 3, 2 and 1 (ml/sec) in order of opening degree stage from large to medium to small, and 1.8 (ml/sec) is requested as the necessary brake fluid passage flow rate Qt. In this case, the opening degree stage setting means is Q≥Qt, and the opening degree stage (medium) of the valve opening degree VA where the brake fluid passage flow rate Q (=2 ml/sec) is closest to the necessary brake fluid passage flow rate Qt (=1.8 ml/sec), in other words, the opening degree stage (medium) corresponding to a minimum among the brake fluid passage flow rates Q that satisfy the relationship of Q≥Qt is selected.

Next, in the brake control device of the third embodiment, applied current applied to the pressure increasing valve $NO_{FL}$, $NO_{FR}$, $NO_{RL}$ or $NO_{RR}$ is set. The brake fluid passage flow rate Q at the valve opening degree VA in the opening degree stage selected in Step ST3 (the one computed in the above Step ST2) is the maximum brake fluid passage flow rate as long as this opening degree stage is selected. The applied current setting means of the third embodiment divides the necessary brake fluid passage flow rate Qt by the maximum brake fluid passage flow rate Q, and the divided value is set as a target value dt of a time duty at the time when the valve is open in the basic cycle Tn (=Qt/Q) (Step ST4).

Next, the applied current setting means sets the valve open pulse width Wp (the valve open time topen) and the valve close time tclose in the basic cycle Tn of applied current so as to bring the pulse density Dp to a value close to the target value dt of the time duty (Step ST5). In other words, here, the valve open pulse width Wp (the valve open time topen) and the valve close time tclose, which result in Dp=topen/Tn≈dt, are obtained (Tn=topen+tclose). At that time, the shortest valve openable time topenmin that is shorter than the basic cycle Tn in the pressure increasing valve $NO_{FL}$, $NO_{FR}$, $NO_{RL}$ or $NO_{RR}$ subjected to control, in other words, a value that is an integral multiple of a minimum valve open pulse width Wpmin that can be output by the pressure increasing valve $NO_{FL}$, $NO_{FR}$, $NO_{RL}$ or $NO_{RR}$ subjected to control, "topenmin*m=Wpmin*m (m=1, 2, 3, ...)" is substituted into the valve open time topen. Moreover, the valve open pulse width Wp (the valve open time topen) and the valve close time tclose may be prepared in advance as map data corresponding to the target value dt of the time duty.

Moreover, the applied current setting means obtains the appropriate current value Iopen of applied current at the time when the valve is open under the slow pressure increase control (Step ST6). The current value Iopen at the time when the valve is open is one that has been corrected in accordance with the valve open pulse width Wp (the valve open time topen) in the above Step ST5 as in the above-mentioned second embodiment, and is for opening the pressure increasing valve $NO_{FL}$, $NO_{FR}$, $NO_{RL}$ or $NO_{RR}$ subjected to control at a desired valve opening degree VA without an excess or lack in accordance with the valve open pulse width Wp (the valve opening degree VA in the opening degree stage selected in the above Step ST3).

Upon computing the current value Iopen at the time when the valve is open, the applied current setting means reads the flow coefficient Kv, the resilient force correction value Pelas (=the constant Celas), the coefficients A, B and C, and the constant Ccavi at the valve opening degree VA in the selected opening degree stage, and based on these and the differential pressure Pdiff used in the above Step ST2, obtains the resilient force correction value Pelas, the Bernoulli force correction value Pber, and the cavitation force correction value Pcavi. Moreover, the applied current setting means checks the valve open pulse width Wp in the above Step ST5 against the pulse width correction value map data in the second embodiment and obtains the pulse width correction pressure Cwpp in accordance with the valve open pulse width Wp. The applied current setting means substitutes the differential pressure Pdiff, the resilient force correction value Pelas, the Bernoulli force correction value Pber, the cavitation force correction value Pcavi and the pulse width correction pressure Cwpp into mathematical formula 11, and obtains the electromagnetic pressure Pelec caused to act on the valve element. The applied current setting means then obtains the current value Iopen of applied current at the time when the valve is open that can open the valve at the valve opening degree VA in the opening degree stage selected in the above Step ST3 based on the electromagnetic pressure Pelec and the characteristic map (the characteristic map of the current value I and the electromagnetic pressure Pelec).

Thereafter, the brake fluid pressure control means repeatedly applies the applied current at each basic cycle Tn to execute the slow pressure increase control (Step ST7). In other words, the brake fluid pressure control means applies the applied current (the current value Iopen at the time when the valve is open, the current value Iclose at the time when the valve is closed, the valve open time topen and the valve close time tclose) to the solenoid of the pressure increasing valve $NO_{FL}$, $NO_{FR}$, $NO_{RL}$ or $NO_{RR}$ subjected to control, opens the valve at the valve opening degree VA in the opening degree stage selected in the above Step ST3 when the valve is opened, and increases the downstream brake fluid pressure (the wheel cylinder pressure Pwc) by the pressure increase amount ΔPn in accordance with a desired target pressure increase gradient S. The brake fluid pressure control means repeats the outputs of the applied current at each basic cycle Tn by the number of output pulses to repeatedly open and close the valve at the valve opening degree VA in an appropriate opening degree stage without the excess or lack, and therefore slowly increases the wheel cylinder pressure Pwc up to the target wheel cylinder pressure Pwct with a desired target pressure increase gradient S.

As shown above, the brake control device of the third embodiment selects an opening degree stage of a minimum valve opening degree VA necessary to allow the brake fluid to pass at the necessary brake fluid passage flow rate Qt in accordance with a desired target pressure increase gradient S, in other words, an opening degree stage corresponding to a minimum that can realize the necessary brake fluid passage flow rate Qt among the brake fluid passage flow rates Q. Moreover, the brake control device obtains the target value dt of the time duty at the time when the valve is open for realizing the target pressure increase amount ΔPt under the slow pressure increase control from the necessary brake fluid passage flow rate Qt and the brake fluid passage flow rate Q at the valve opening degree VA in the selected opening degree stage, sets the pulse density Dp that is a value close to the target value dt of the time duty, and obtains the valve open pulse width Wp that can realize a pressure increase by the pressure increase amount ΔPn in accordance with a desired target pressure increase gradient S when the valve is open at the valve opening degree VA. Therefore, the brake control device can perform the slow pressure increase control at a minimum necessary valve opening degree VA; accordingly, it is possible to reduce the operation sound and vibration upon opening and closing compared with upon opening and closing in an opening degree stage of a valve opening degree VA larger than necessary. Moreover, the brake control device can suppress the operation amount of the valve element upon opening and closing by performing the slow pressure increase control at a minimum necessary valve opening degree VA; accordingly, it is possible to avoid having a large operation amount at a valve opening degree VA larger than necessary to improve responsiveness when the valve is repeatedly opened and closed. Furthermore, similarly to the above-mentioned second embodiment, the brake control device can obtain the appropriate current value Iopen at the time when the valve is open in accordance with the valve open pulse width Wp, and can open the pressure increasing valve $NO_{FL}$, $NO_{FR}$, $NO_{RL}$ or $NO_{RR}$ at a desired valve opening degree VA selected without an excess or lack of the opening degree; accordingly, it is made possible to perform the slow pressure increase control with high accuracy. In this manner, according to the brake control device of the third embodiment, even if means for detecting the wheel cylinder pressure Pwc is not provided, it is possible to perform the slow pressure increase control with excellence in responsiveness and high accuracy while the operation sound and vibration at the time when the pressure increasing valve $NO_{FL}$, $NO_{FR}$, $NO_{RL}$ or $NO_{RR}$ is opened and closed are reduced.

The third embodiment illustrates that applied current is obtained based on the electromagnetic pressure Pelec caused to act on the valve element; however, the applied current may be computed based on the electromagnetic force Felec.

Moreover, the above-mentioned present invention has been described taking an example in pressure increase mode, but may be applied in pressure reduction mode based on the similar idea as described in the first and second embodiments.

Furthermore, the opening degree stage setting means may select an opening degree stage corresponding to a maximum that does not exceed the necessary brake fluid passage flow rate Qt among the brake fluid passage flow rates Q in the above Step ST3.

Fourth Embodiment

Figure 10:
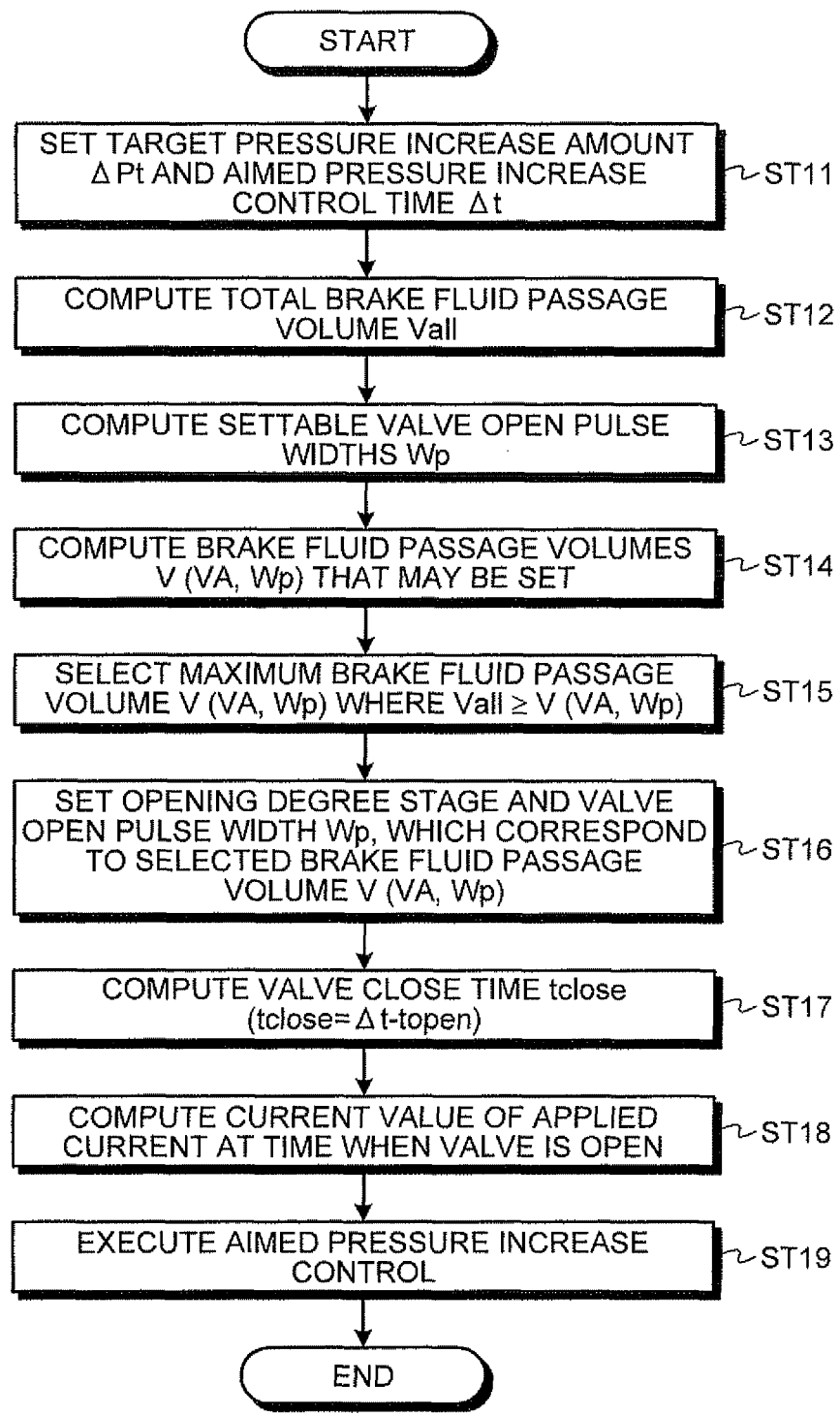
FIG. 10 is a flowchart explaining aimed pressure increase control operations in a brake control device of a fourth embodiment.

Next, a description will be given on a fourth embodiment of a brake control device according to the present invention with reference to FIG. 10.

Under ABS control, in some cases, after the wheel cylinder pressure Pwc in a wheel subjected to control is reduced in pressure reduction mode to return from the slip state, it is held in holding mode for a certain time period, and the mode is switched to pressure increase mode to quickly restore the wheel cylinder pressure Pwc within a range that does not lead to the slip state again. Therefore, in pressure increase mode, a fixed pressure increase amount ΔP (=the target pressure increase amount ΔPt) may be aimed to quickly increase pressure (hereinafter referred to as "aimed pressure increase"). Upon the aimed pressure increase, in order to achieve an object in quickly restoring the wheel cylinder pressure Pwc, the target pressure increase amount ΔPt is produced with a high pressure increase gradient in a short period of time unlike at the time of slow pressure increase that gradually increases pressure by repeating opening and closing to finally achieve a pressure increase by the target pressure increase amount ΔPt.

The brake control device of the fourth embodiment is one where a configuration appropriate to execute such aimed pressure increase control is added to the above-mentioned brake control device of the third embodiment. A description will hereinafter be given on the aimed pressure increase control by the brake control device of the fourth embodiment based on the flowchart of FIG. 10.

Firstly, in the brake control device of the fourth embodiment, a target pressure increase amount ΔPt under the aimed pressure increase control and an aimed pressure increase control time Δt are determined (Step ST11). The aimed pressure increase control time Δt indicates a control cycle upon the aimed pressure increase control (one cycle of an output pulse) (Δt=topen+tclose). The target pressure increase amount ΔPt and the aimed pressure increase control time Δt indicate target values usually output in accordance with a vehicle under ABS control. Moreover, based on the target pressure increase amount ΔPt and the specifications of the pressure increasing valve $NO_{FL}$, $NO_{FR}$, $NO_{RL}$ or $NO_{RR}$ subjected to control (the shortest time required to increase pressure by the target pressure increase amount ΔPt), the aimed pressure increase control time Δt may be set so as to be longer than at least the shortest time. The electronic control unit 1 is provided with aimed pressure increase control conditions setting means for setting the target pressure increase amount ΔPt under the aimed pressure increase control and the aimed pressure increase control time Δt, in other words, the control conditions on the aimed pressure increase control.

The brake flow rate obtaining means of the fourth embodiment obtains a total brake fluid passage volume Vall necessary to realize a pressure increase by the target pressure increase amount ΔPt under the aimed pressure increase control (Step ST12). The total brake fluid passage volume Vall is obtained by subtracting the consumption volume of the brake fluid at present wheel cylinder pressure Pwc from the consumption volume of the brake fluid at the increased target wheel cylinder pressure Pwct (=Pwc ΔPt) based on the target pressure increase amount ΔPt, the volume stiffness Qf of the brake fluid that is previously stored, and the present downstream brake fluid pressure of the pressure increasing valve $NO_{RL}$, $NO_{FR}$, $NO_{RL}$ or $NO_{RR}$ (the wheel cylinder pressure Pwc). The consumed fluid volumes are derived from the volume stiffness Qf.

Moreover, in the brake control device of the fourth embodiment 4, the valve open pulse widths Wp that can be set within a range that does not exceed the aimed pressure increase control time Δt are obtained based on the shortest valve openable time topenmin (the minimum valve open pulse width Wpmin) at the pressure increasing valve $NO_{FL}$, $NO_{FR}$, $NO_{RL}$ or $NO_{RR}$ subjected to control (Step ST13). In other words, in Step ST13, the valve open pulse widths Wp that establish the relationship of "Δt≥topenmin*m=Wpmin*m (m=1, 2, 3, ...)" are obtained. The electronic control unit 1 is provided with settable valve open pulse width computing means for obtaining the settable valve open pulse width Wp.

The brake flow rate obtaining means then obtains all brake fluid passage volumes V (VA, Wp) that may be set under the aimed pressure increase control by the following mathematical formula 15 for each of all combinations of (the flow coefficients Kv of) the valve opening degrees VA in the opening degree stage of the pressure increasing valve $NO_{FL}$, $NO_{FR}$, $NO_{RL}$ or $NO_{RR}$ and the settable valve open pulse widths Wp (the valve open times topers) obtained in the above Step ST13 (Step ST14). In the computation of the brake fluid passage volume V (VA, Wp), similarly to the first to third embodiments, a present difference between the upstream brake fluid pressure and the downstream brake fluid pressure of the pressure increasing valve $NO_{FL}$, $NO_{FR}$, $NO_{RL}$ or $NO_{RR}$ subjected to control (the differential pressure Pdiff between the master cylinder pressure Pmc and the wheel cylinder pressure Pwc) is obtained by use of the master cylinder pressure Pmc detected by the brake fluid pressure sensor 83 and the wheel cylinder pressure Pwc estimated from the past record.

$$V(VA, Wp) = topen*Kv\sqrt{Pdiff} = Wp*Kv\sqrt{Pdiff} \quad (15)$$

The brake flow rate obtaining means compares the computed values in Step ST14 with the total brake fluid passage volume Vall in the above Step ST12, and selects a maximum that does not exceed the total brake fluid passage volume Vall from the settable brake fluid passage volumes V (VA, Wp) (Step ST15). The opening degree stage setting means and the applied current setting means then set the opening degree stage of the valve opening degree VA and the valve open pulse width Wp, which correspond to the selected brake fluid passage volume V (VA, Wp), for the aimed pressure increase control, respectively (Step ST16). In other words, the aimed pressure increase control opens the pressure increasing valve $NO_{FL}$, $NO_{FR}$, $NO_{RL}$ or $NO_{RR}$ subjected to control at the valve opening degree VA in the set opening degree stage for the valve open pulse width Wp (the valve open time topen), and accordingly increases the wheel cylinder pressure Pwc by the maximum pressure increase amount within a range that does not exceed the target pressure increase amount ΔPt.

The applied current setting means obtains the valve close time tclose by subtracting the valve open time topen from the aimed pressure increase control time Δt (Step ST17).

The applied current setting means then obtains the electromagnetic pressure Pelec based on the valve opening degree VA in the set opening degree stage and the set valve open pulse width Wp, and the present difference between the upstream brake fluid pressure and the downstream brake fluid pressure of the pressure increasing valve $NO_{FL}$, $NO_{FR}$, $NO_{RL}$ or $NO_{RR}$ subjected to control (the differential pressure Pdiff between the master cylinder pressure Pmc and the wheel cylinder pressure Pwc), and obtains the current value Iopen of applied current at the time when the valve is open that generates the electromagnetic pressure Pelec from the characteristic map (the characteristic map of the current value I and the electromagnetic pressure Pelec) (Step ST18). At that time, the applied current setting means reads the flow coefficient Kv, the resilient force correction value Pelas (=the constant Celas), the coefficients A, B and C, and the constant Ccavi at the valve opening degree VA in the set opening degree stage, and based on these and the differential pressure Pdiff used in the above Step ST14, obtains the resilient force correction value Pelas, the Bernoulli force correction value Pber and the cavitation force correction value Pcavi. Moreover, the applied current setting means checks the set valve open pulse width Wp against the pulse width correction value map data in the second and third embodiments to obtain the pulse width correction pressure Cwpp in accordance with the valve open pulse width Wp. The applied current setting means then substitutes the differential pressure Pdiff, the resilient force correction value Pelas, the Bernoulli force correction value Pber, the cavitation force correction value Pcavi and the pulse width correction pressure Cwpp into mathematical formula 11, and computes the current value Iopen of applied current at the time when the valve is open that opens the pressure increasing valve $NO_{FL}$, $NO_{FR}$, $NO_{RL}$ or $NO_{RR}$ subjected to control at the valve opening degree VA for the valve open pulse width Wp.

Thereafter, the brake fluid pressure control means applies the applied current to the pressure increasing valve $NO_{FL}$, $NO_{FR}$, $NO_{RL}$ or $NO_{RR}$ subjected to control and executes the aimed pressure increase control (Step ST19). In other words, the brake fluid pressure control means applies the applied current (the current value Iopen at the time when the valve is open, the current value Iclose at the time when the valve is closed, the valve open time topen and the valve close time tclose) to the solenoid of the pressure increasing valve $NO_{FL}$, $NO_{FR}$, $NO_{RL}$ or $NO_{RR}$ subjected to control to open the pressure increasing valve $NO_{FL}$, $NO_{FR}$, $NO_{RL}$ or $NO_{RR}$ at the valve opening degree VA in the opening degree stage and the valve open pulse width Wp (the valve open time topen), which are set in the above Step ST16. Accordingly, the wheel cylinder pressure Pwc is increased by a pressure increase amount that is closest within a range that does not exceed the target pressure increase amount ΔPt.

As shown above, the brake control device of the fourth embodiment obtains the brake fluid passage volumes v (VA, Wp) by a plurality of combinations of the valve opening degrees VA in the settable opening degree stages and the settable valve open pulse widths Wp, selects a maximum within a range that does not exceed the total brake fluid passage volume Vall from them, and sets the valve opening degree VA in the opening degree stage and the valve open pulse width Wp, which correspond to the selected brake fluid passage volume V (VA, Wp), for the aimed pressure increase control. In order to open the pressure increasing valve $NO_{FL}$, $NO_{FR}$, $NO_{RL}$ or $NO_{RR}$ subjected to control at the valve opening degree VA for the valve open pulse width Wp, the brake control device considers not only the difference between the upstream brake fluid pressure and the downstream brake fluid pressure of the pressure increasing valve $NO_{FL}$, $NO_{FR}$, $NO_{RL}$ or $NO_{RR}$ (the differential pressure Pdiff between the master cylinder pressure Pmc and the wheel cylinder pressure Pwc) but also other forces to act on the valve element, in other words, the resilient force Felas of the elastic body, and the Bernoulli force Fber and the cavitation force Fcavi by the flow of the brake fluid, further corrects this with a correction value corresponding to the valve open pulse width Wp (the valve open time topen), computes the electromagnetic pressure Pelec, and obtains the appropriate current value Iopen of applied current at the time when the valve is open with good accuracy. Therefore, the brake control device can aim to increase the wheel cylinder pressure Pwc with high accuracy.

The fourth embodiment illustrates that applied current is obtained based on the electromagnetic pressure Pelec caused to act on the valve element; however, the applied current may be computed based on the electromagnetic force Felec.

Moreover, the above-mentioned present invention has been described taking an example in pressure increase mode, but may be applied in pressure reduction mode based on the similar idea as described in the first to third embodiments.

Furthermore, the brake flow rate obtaining means may select a minimum that exceeds the total brake fluid passage volume Vall from the settable brake fluid passage volumes V (VA, Wp) in the above Step ST15.

Fifth Embodiment

In a fifth embodiment, a description will be given on a specific application example using the above-mentioned configurations of the third and fourth embodiments.

For example, if ABS control takes place in the brake device for a vehicle illustrated in the above descriptions, the brake control means monitors the motions of the wheels Wfl, Wfr, Wrl and Wrr based on the detection information of wheel speed sensors $91_{FL}$, $91_{FR}$, $91_{RL}$ and $91_{RR}$. As a result, if the wheel Wfl, Wfr, Wrl or Wrr that exceeds a predetermined threshold value of a slip amount is detected, the brake fluid pressure control means starts ABS control targeting the relevant wheel Wfl, Wfr, Wrl or Wrr.

Firstly, the brake fluid pressure control means instructs the pressure increasing valve $NO_{FL}$, $NO_{FR}$, $NO_{RL}$ or $NO_{RR}$ of the wheel Wfl Wfr, Wrl or Wrr subjected to control to close as well as instructs the pressure reducing valve $NC_{FL}$, $NC_{FR}$, $NC_{RL}$ or $NC_{RR}$ to open, and reduces the wheel cylinder pressure Pwc in the wheel Wfl, Wfr, Wrl or Wrr subjected to control in pressure reduction mode to avoid the slip state.

The brake fluid pressure control means subsequently passes the holding mode and executes the aimed pressure increase control described in the fourth embodiment to quickly increase the wheel cylinder pressure Pwc in the wheel Wfl, Wfr, Wrl or Wrr subjected to control within a range that does not fall into the slip state again. The holding mode is not necessarily required to be interposed.

Here, it is assumed that the target pressure increase amount ΔPt under the aimed pressure increase control is set to "supposing ΔPt=1 MPa" from the state of the vehicle, and the aimed pressure increase control time Δt to "Δt=20 msec." Moreover, it is assumed that the opening degree stage of the pressure increasing valve $NO_{FL}$, $NO_{FR}$, $NO_{RL}$ or $NO_{RR}$ includes three stages of large, medium and small, and the flow coefficient Kv is set to "Kv=250, 150, 50 ml/sec" in order of the opening degree stages. Moreover, it is assumed that the minimum valve open pulse width Wpmin (the shortest valve openable time topenmin) of the pressure increasing valve $NO_{FL}$, $NO_{FR}$, $NO_{RL}$ or $NO_{RR}$ is set to "Wpmin=topenmin=5 msec." Furthermore, it is assumed that the differential pressure Pdiff=1 for convenience of computation.

The brake flow rate obtaining means obtains the total brake fluid passage volume Vall of brake fluid necessary to increase pressure by the target pressure increase amount ΔPt (=1 MPa). For example, if a present wheel cylinder pressure Pwc is "Pwc=1.5 MPa," the brake fluid pressure control means derives a consumption volume V1 of brake fluid at the increased target wheel cylinder pressure Pwct (=1.5+1.0=2.5 MPa) and a consumption volume V2 of brake fluid at the present wheel cylinder pressure Pwc from the volume stiffness Qf, and obtains the total brake fluid passage volume Vall by subtracting the consumption volume V2 from the consumption volume V1. With regard to the total brake fluid passage volume Vall, suppose Vall=2.8 ml.

Moreover, the settable valve open pulse width computing means obtains the valve open pulse widths Wp that can be set within a range that does not exceed the aimed pressure increase control time Δt=20 msec based on the shortest valve openable time topenmin (the minimum valve open pulse width Wpmin)=5 msec at the pressure increasing valve $NO_{FL}$, $NO_{FR}$, $NO_{RL}$ or $NO_{RR}$ subjected to control. Here, the valve open pulse widths Wp=5, 10, 15, 20 msec are set.

Next, the brake flow rate obtaining means obtains all brake fluid passage volumes V (VA, Wp) that may be set under the aimed pressure increase control by use of the above-mentioned mathematical formula 15 for each of all combinations of the valve open pulse widths Wp (5, 10, 15, 20 msec) and the flow coefficients Kv (250, 150, 50 ml/sec) at the valve opening degrees VA in the opening degree stages. The brake flow rate obtaining means then selects a maximum from the brake fluid passage volumes V (VA, Wp) that establish the relationship of "Vall (=2.8 ml)≥V (VA, Wp)." The maximum brake fluid passage volume V (VA, Wp) is the brake fluid passage volume V (VA (large), 10)=2.50 ml at the valve opening degree VA in the valve opening stage (large) and with the valve open pulse width Wp=10 msec.

The applied current setting means sets 10 msec where the valve open pulse width Wp (=10 msec) is excluded from the aimed pressure increase control time Δt (=20 msec) to the valve close time under the aimed pressure increase control. The applied current setting means then obtains the current value Iopen to open the pressure increasing valve $NO_{FL}$, $NO_{FR}$, $NO_{RL}$ or $NO_{RR}$ subjected to control at the valve opening degree VA in the opening degree stage (large) for the valve open pulse width Wp=10 msec from the electromagnetic force Felec or the electromagnetic pressure Pelec obtained based on the above mathematical formula 10 or 11. The brake fluid pressure control means applies the current value Iopen to the pressure increasing valve $NO_{FL}$, $NO_{FR}$, $NO_{RL}$ or $NO_{RR}$ subjected to control for the first 10 msec, and applies the current value Iclose thereto for the remaining 10 msec. Accordingly, the pressure increasing valve $NO_{FL}$, $NO_{FR}$, $NO_{RL}$ or $NO_{RR}$ subjected to control is opened at the valve opening degree VA in the opening degree stage (large) for the first 10 msec, increases the wheel cylinder pressure Pwc by a pressure increase amount in accordance with the brake fluid passage flow rate Q (VA (large), 10)=2.50 ml, and is closed for the remaining 10 msec. Hence, at this time, it is possible to increase the wheel cylinder pressure Pwc by a pressure increase amount that is closest within a range that does not exceed the target pressure increase amount ΔPt (=1 MPa); accordingly, the aimed pressure increase control with high accuracy is made possible.

If the conditions are applied to the above-mentioned third embodiment for the aimed pressure increase control, the result is the necessary brake fluid passage flow rate Qt=Vall/Δt=140 ml/sec, and the opening degree stage (medium) in the valve opening degree VA where the brake fluid passage flow rate Q=150 ml/sec is selected in Step ST3. The target value dt of the time duty at the time when the valve is open is "dt=Qt/Q=14/15"; accordingly, the pulse density Dp that is close to the target value dt of the time duty results in "Dp=topen/Tn=Wp/Δt=15/20" in Step ST5, and the valve open pulse width Wp (the valve open time topen)=15 msec, and the valve close time tclose=5 msec. Therefore, in the third embodiment, it results in the valve opening degree VA in the opening degree stage (medium) and the valve open pulse width Wp=15 msec, and then the brake fluid passage volume V "V=2.25 ml." Hence, if the aimed pressure increase control takes place with the configuration of the fourth embodiment, it can be executed with better accuracy than with the configuration shown in the third embodiment.

Next, under the ABS control, the wheel cylinder pressure Pwc is increased under the aimed pressure increase control, and then the wheel cylinder pressure Pwc is slowly increased as in the third embodiment while the wheel Wfl, Wfr, Wrl or Wrr subjected to control is monitored based on the slip amount. Here, the target pressure increase gradient S is assumed to be set to "S=5 MPa/sec."

The brake flow rate obtaining means obtains the necessary brake fluid passage flow rate Qt at the time when the pressure is slowly increased with the target pressure increase gradient S (5 MPa/sec). For example, if the volume stiffness Qf at a present wheel cylinder pressure Pwc is "Qf=0.2 ml/MPa," the necessary brake fluid passage flow rate Qt results in 1.0 ml/sec from the arithmetic expression of "Qt=S*Qf."

Moreover, the brake flow rate obtaining means obtains the brake fluid passage flow rates Q at the valve opening degrees VA in the opening degree stages in accordance with the present differential pressure Pdiff based on the present differential pressure Pdiff of the pressure increasing valve $NO_{FL}$, $NO_{FR}$, $NO_{RL}$ or $NO_{RR}$ subjected to control and the flow coefficients Kv (250, 150, 50 ml/sec) at the valve opening degrees VA in the opening degree stages. The opening degree stage setting means then selects an opening degree stage corresponding to a minimum among the brake fluid passage flow rates Q that establish the relationship of "Qt (=1.0 ml/sec)≤Q" (for example, the opening degree stage (small)).

The applied current setting means divides the necessary brake fluid passage flow rate Qt by the brake fluid passage flow rate Q, and sets the divided value as the target value dt of the time duty at the time when the valve is open in the basic cycle Tn. For example, here, it is assumed that the brake fluid passage flow rate Q is set to "Q=1.4 ml/sec," and the target value dt of the time duty to "dt=0.7."

The applied current setting means then sets the valve open pulse width Wp (the valve open time topen) and the valve close time tclose in the basic cycle Tn of applied current so as to bring the pulse density Dp to a value close to the target value dt of the time duty (=0.7). At that time, with regard to the valve open pulse width Wp (the valve open time topen) and the valve close time tclose, the applied current setting means reads ones corresponding to the target value dt of the time duty (=0.7) from the map data. For example, the valve open pulse width Wp (the valve open time topen)=10 msec and the valve close time tclose=5 msec, where the pulse density Dp≈0.67, are set. Hence, the basic cycle Tn is "Tn=15 msec."

The applied current setting means obtains the current value Iopen of applied current at the time when the valve is open from the electromagnetic force Felec or the electromagnetic pressure Pelec obtained based on the above mathematical formula 9. The current value Iopen is for opening the pressure increasing valve $NO_{FL}$, $NO_{FR}$, $NO_{RL}$ or $NO_{RR}$ subjected to control at the valve opening degree VA in the set opening degree stage (small) only for the valve open pulse width Wp=10 msec. The brake fluid pressure control means applies, to the pressure increasing valve $NO_{FL}$, $NO_{FR}$, $NO_{RL}$ or $NO_{RR}$ subjected to control, the current value Iopen for the first 10 msec and the current value Iclose for the remaining 5 msec. Accordingly, the pressure increasing valve $NO_{FL}$, $NO_{FR}$, $NO_{RL}$ or $NO_{RR}$ subjected to control is opened at the valve opening degree VA in the opening degree stage (small) for the first 10 msec to increase the wheel cylinder pressure Pwc and is closed for the remaining 5 msec.

The brake fluid pressure control means repeats slow pressure increases with a gradient close to the target pressure increase gradient S (=5 MPa/sec) in the basic cycle Tn. If the slip amount exceeds the predetermined threshold value again under the slow pressure increase control, the brake fluid pressure control means then switches to the pressure reduction mode again, repeats the above operations, and executes ABS control.

In this manner, upon increasing the reduced wheel cylinder pressure Pwc, the brake control device of the fifth embodiment quickly increases the pressure under the aimed pressure increase control with high accuracy, and then gradually increases the pressure under the slow pressure increase control that has less operation sound and vibration with good accuracy. Hence, the brake control device smoothly starts increasing the braking force after pressure reduction by the aimed pressure increase control and ABS control can take place with high accuracy, which can avoid another slip by the subsequent slow pressure increase control.

The brake control devices of the above-mentioned first to fifth embodiments have been illustrated as the ones for a brake device for a vehicle that does not have means for detecting the wheel cylinder pressure Pwc, but may be applied to a case of having the detection means. Accordingly, even under, for example, situations such as where the detection results of the detection means vary, the brake control device in this case can increase the wheel cylinder pressure Pwc with good accuracy without using the detection results.

Moreover, the above-mentioned first to fifth embodiments illustrate that normally opened solenoid valves are used for the pressure increasing valves $NO_{FL}$, $NO_{FR}$, $NO_{RL}$ and $NO_{RR}$ and normally closed solenoid valves are used for the pressure reducing valves $NC_{FL}$, $NC_{FR}$, $NC_{RL}$ and $NC_{RR}$, but are not necessarily limited to these kinds. For example, on-off valves such as what is called linear solenoid valves including a coil and the like may be used for the pressure increasing valves $NO_{FL}$, $NO_{FR}$, $NO_{RL}$ and $NO_{RR}$ and the pressure reducing valves $NC_{FL}$, $NC_{FR}$, $NC_{RL}$ and $NC_{RR}$. Therefore, if the linear solenoid valves are used, the resilient force Felas shown in the first to fifth embodiments is excluded from the arithmetic expressions, and the current value Iopen at the time when the valve is open is obtained.

INDUSTRIAL APPLICABILITY

As described above, the brake control device according to the present invention is useful for a technology for increasing or reducing the wheel cylinder pressure with good accuracy even if means for detecting brake fluid pressure is not provided therefor.

REFERENCE SIGNS LIST

1 ELECTRONIC CONTROL UNIT
5 BRAKE FLUID PRESSURE
6 BRAKE FLUID PRESSURE REGULATION UNIT
7 BRAKING FORCE GENERATION UNIT
20 BRAKE FLUID PRESSURE GENERATION MEANS
30 HIGH-PRESSURE GENERATION MEANS
$40_{FL}$, $40_{FR}$, $40_{RL}$, $40_{RR}$ BRAKE FLUID PRESSURE REGULATION MEANS
$50_{FL}$, $50_{FR}$, $50_{RL}$, $50_{RR}$ BRAKING FORCE GENERATION MEANS
83 BRAKE FLUID PRESSURE SENSOR
$NC_{FL}$, $NC_{FR}$, $NC_{RL}$, $NC_{RR}$ PRESSURE REDUCING VALVE (FLOW CONTROL VALVE)

NO_{FL}, NO_{FR}, NO_{RL}, NO_{RR} PRESSURE INCREASING VALVE (FLOW CONTROL VALVE)
Wfl, Wfr, Wrl, Wrr WHEEL

The invention claimed is:

1. A brake control device comprising:
a flow control valve, placed between a brake fluid pressure generation unit on an upstream side that generates brake fluid pressure and a braking force generation unit on a downstream side that generates braking force in accordance with the brake fluid pressure to a wheel, that regulates the brake fluid pressure to the braking force generation unit by controlling a flow rate of brake fluid;
a differential pressure obtaining unit that obtains, from brake fluid pressure on upstream and downstream sides of the flow control valve, information on a difference of the brake fluid pressure;
a hydrodynamic force obtaining unit that obtains information on hydrodynamic force that is a sum of forces in valve closing and opening directions working on a valve element by a flow of brake fluid passing through the flow control valve; and
a brake fluid pressure control unit that controls the flow control valve by use of the information on the differential pressure and the information on the hydrodynamic force.

2. The brake control device according to claim 1, wherein applied current for operating the valve element is set by use of the information on the differential pressure and the information on the hydrodynamic force, and
the brake fluid pressure control unit applies the applied current to the flow control valve configured as an on-off valve that controls a flow rate of brake fluid by opening and closing a flow passage of the brake fluid with the valve element, thereby driving the flow control valve to be opened and closed.

3. The brake control device according to claim 1, wherein applied rectangular wave current for operating the valve element is obtained by use of the information on the differential pressure and the information on the hydrodynamic force and a current value of the applied current at the time when the valve is open is corrected in accordance with a pulse width of the rectangular wave at the time when the valve is open, and
the brake fluid pressure control unit applies the corrected applied current to the flow control valve configured as an on-off valve that controls a flow rate of brake fluid by opening and closing a flow passage of the brake fluid with the valve element, thereby driving the flow control valve to be opened and closed.

4. The brake control device according to claim 3, wherein the current value of the applied current at the time when the valve is open is corrected to decrease a valve opening degree of the flow control valve as the pulse width at the time when the valve is open becomes longer while being corrected to increase the valve opening degree of the flow control valve as the pulse width at the time when the valve is open becomes shorter.

5. The brake control device according to claim 1, further comprising:
a brake flow rate obtaining unit that computes a necessary brake fluid passage flow rate, in the flow control valve, necessary to increase the brake fluid pressure to the braking force generation unit with a desired target pressure increase gradient, and computes a brake fluid passage flow rate in each opening degree stage of the flow control valve;
a opening degree stage setting unit that sets the opening degree stage of the flow control valve to an opening degree stage corresponding to a minimum satisfying the necessary brake fluid passage flow rate or a maximum not exceeding the necessary brake fluid passage flow rate, among the brake fluid passage flow rates; and
an applied current setting unit that determines a pulse width of applied rectangular wave current at the time when the valve is open for operating the valve element based on the differential pressure, a valve opening degree in the set opening degree stage and the necessary brake fluid passage flow rate, and obtains a current value of the applied current at the time when the valve is open by use of the information on the differential pressure and the information on the hydrodynamic force as well as corrects the current value at the time when the valve is open in accordance with the pulse width of the rectangular wave at the time when the valve is open, wherein
the brake fluid pressure control unit applies the corrected applied current to the flow control valve configured as an on-off valve that controls a flow rate of brake fluid by opening and closing a flow passage of the brake fluid with the valve element, thereby driving the flow control valve to be opened and closed.

6. The brake control device according to claim 1, further comprising:
a settable valve open pulse width computing unit that obtains a pulse width of applied rectangular wave current settable within a range not exceeding a predetermined pressure increase control time at the time when the valve is open;
a brake flow rate obtaining unit that computes a total brake fluid passage volume of the flow control valve necessary to increase the brake fluid pressure to the braking force generation unit with a desired target pressure increase gradient as well as computes a brake fluid passage volume settable by all combinations of opening degree stages of the flow control valve and the settable pulse widths at the time when the valve is open, and selects a maximum not exceeding the total brake fluid passage volume or a minimum exceeding the total brake fluid passage volume from the settable brake fluid passage volumes;
an opening degree stage setting unit that sets the opening degree stage of the flow control valve to an opening degree stage corresponding to the selected brake fluid passage volume; and
an applied current setting unit that sets the pulse width of the applied current at the time when the valve is open to a pulse width corresponding to the selected brake fluid passage volume, and obtains a current value of the applied current at the time when the valve is open by use of the information on the differential pressure and the information on the hydrodynamic force as well as corrects the current value at the time when the valve is open in accordance with the set pulse width at the time when the valve is open, wherein
the brake fluid pressure control unit applies the corrected applied current to the flow control valve configured as an on-off valve that controls a flow rate of brake fluid by opening and closing a flow passage of the brake fluid with the valve element, thereby driving the flow control valve to be opened and closed.

7. The brake control device according to claim 1, wherein the force in the valve closing direction is Bernoulli force proportional to a square of the differential pressure, and the force in the valve opening direction is cavitation force proportional to the differential pressure and inversely proportional to the brake fluid pressure on the downstream side of the flow control valve.

8. The brake control device according to claim 1, wherein
the flow control valve includes an elastic body causing elastic force in a direction opposite to acting force on the valve element by applied current, to act on the valve element, and
the brake fluid pressure control unit controls the flow control valve by use of information on the elastic force in addition to the information on the differential pressure and the information on the hydrodynamic force.

9. The brake control device according to claim 2, wherein
the flow control valve includes an elastic body causing elastic force in a direction opposite to acting force on the valve element by the applied current, to act on the valve element, and
the applied current setting unit sets the applied current by use of information on the elastic force in addition to the information on the differential pressure and the information on the hydrodynamic force.

10. The brake control device according to claim 1, wherein
master cylinder pressure is obtained as the brake fluid pressure on the upstream side of the flow control valve, and
the brake fluid pressure to the braking force generation unit is estimated as the brake fluid pressure on the downstream side of the flow control valve.

\* \* \* \* \*